United States Patent
Kim et al.

(10) Patent No.: US 7,969,382 B2
(45) Date of Patent: Jun. 28, 2011

(54) PORTABLE MULTI-DISPLAY DEVICE

(75) Inventors: Si Han Kim, Kyunggi-Do (KR); Hyun Hee Kim, Kyunggi-Do (KR); Jang Ho Kim, Kyunggi-Do (KR)

(73) Assignee: Si Han Kim, Kyunggi-Do (KR)

( * ) Notice: Subject to any disclaimer, the term of this patent is extended or adjusted under 35 U.S.C. 154(b) by 994 days.

(21) Appl. No.: 11/530,184

(22) Filed: Sep. 8, 2006

(65) Prior Publication Data

US 2007/0063922 A1 Mar. 22, 2007

Related U.S. Application Data

(63) Continuation of application No. 10/478,018, filed as application No. PCT/KR02/01596 on Aug. 24, 2002, now abandoned.

(30) Foreign Application Priority Data

| Aug. 25, 2001 | (KR) | 2001-51506 |
| Sep. 5, 2001 | (KR) | 2001-54462 |
| Sep. 12, 2001 | (KR) | 2001-56112 |
| Oct. 22, 2001 | (KR) | 2001-64898 |

(51) Int. Cl.
*G09G 5/00* (2006.01)

(52) U.S. Cl. ........... 345/1.1; 345/1.2; 345/1.3; 345/169; 345/903; 345/905; 351/680; 455/100

(58) Field of Classification Search ............ 345/1.1–1.3, 345/169, 905, 903; 361/680–83; 455/100
See application file for complete search history.

(56) References Cited

U.S. PATENT DOCUMENTS

| 5,128,662 | A | | 7/1992 | Failla |
| 5,710,576 | A | | 1/1998 | Nishiyama et al. |
| 5,914,698 | A | * | 6/1999 | Nicholson et al. ............. 345/1.3 |
| 5,931,297 | A | * | 8/1999 | Weill et al. .................... 206/320 |
| 6,038,670 | A | * | 3/2000 | Oh ................................. 713/300 |
| 6,049,813 | A | | 4/2000 | Danielson et al. |
| 6,144,358 | A | * | 11/2000 | Narayanaswamy et al. .. 345/102 |
| 6,157,718 | A | * | 12/2000 | Kaschke ..................... 455/569.1 |
| 6,262,785 | B1 | * | 7/2001 | Kim .................................. 349/58 |
| 6,295,038 | B1 | * | 9/2001 | Rebeske ......................... 345/1.1 |
| 6,327,482 | B1 | | 12/2001 | Miyashita |
| 6,370,362 | B1 | * | 4/2002 | Hansen et al. ................ 455/90.1 |
| 6,580,952 | B2 | * | 6/2003 | Fukuda et al. .................. 700/83 |
| 6,628,244 | B1 | * | 9/2003 | Hirosawa et al. .............. 345/1.1 |

(Continued)

FOREIGN PATENT DOCUMENTS

KR 90 6988 A 5/1990

(Continued)

*Primary Examiner* — Richard Hjerpe
*Assistant Examiner* — Jeffrey Steinberg
(74) *Attorney, Agent, or Firm* — Norris, McLaughlin & Marcus, P.A.

(57) ABSTRACT

A separable portable multi-display device is provided. A portable multi-display device includes a main body panel housing having a first display, a sub-panel housing having a second display, and a coupling device for coupling the main body panel housing to the sub-panel housing such that at least one sides of the first display and the second display can contact each other. The panel housings are separable from and connectable to each other, a range of a border between the displays when the panel housings are interconnected being minimized so that the displays can be shown as if it is driven as a single screen.

17 Claims, 37 Drawing Sheets

U.S. PATENT DOCUMENTS

| | | | |
|---|---|---|---|
| 6,643,124 B1 | 11/2003 | Wilk | |
| 6,809,718 B2 * | 10/2004 | Wei et al. | 345/102 |
| 6,816,129 B1 * | 11/2004 | Zimmerman | 345/1.1 |
| 6,859,219 B1 * | 2/2005 | Sall | 345/1.1 |
| 6,919,864 B1 | 7/2005 | Macor | |
| 7,208,718 B2 * | 4/2007 | Park et al. | 250/214 R |
| 2002/0021258 A1 | 2/2002 | Koenig | |

FOREIGN PATENT DOCUMENTS

| | | |
|---|---|---|
| KR | 98 69653 A | 10/1998 |
| KR | 99 78832 A | 11/1999 |
| KR | 02 59552 A | 7/2002 |

\* cited by examiner

PORTABLE MULTI-DISPLAY DEVICE

TECHNICAL FIELD

The present invention relates to a portable multi-display device and, more particularly, to a portable multi-display device having a main body panel housing and a sub-panel housing each having a display, and coupling means, the panel housings being separately interconnected by connecting means.

BACKGROUND ART

A method for realizing a single large-sized screen by use of at least two displays has been used for a large size display device. Generally, a flat display is used for a portable display device. An LCD (Liquid Crystal Display), an FED (Field Emission Display), a PDP (Plasma Display Panel), an EL (Electro Luminescent) are well known as the flat display.

In recent years, since new functions such as a wireless Internet have been added to the portable display device, a display device having a large-sized screen has been required. However, such a large-sized portable display has a problem of its mobility due to its overall size. To overcome this problem, a foldable multi-display device has been proposed.

In the foldable multi-display device, more than two displays are interconnected to be foldable, but not separable. That is, the separation and connection of the displays cannot be flexibly realized. For example, it is impossible for a user to carry only one display, deteriorating the mobility and convenience that are the inherent properties of the portable display device.

DISCLOSURE OF INVENTION

Therefore, the present invention has been made in an effort to solve the above-described problems.

It is an objective of the present invention to provide a portable multi-display device having a main body panel housing and a sub-panel housing each having a display, the panel housings being designed to be separable from and connectable to each other, a range of a border between the displays being minimized when the panel housings are interconnected so that the displays can be shown as if it is driven as a single screen.

To achieve the above objective, the present invention provides a portable multi-display device comprising a main body panel housing having a first display; a sub-panel housing having a second display; and coupling means for coupling the main body panel housing to the sub-panel housing such that at least one sides of the first display and the second display can contact each other.

A side portion of the main body panel housing and a side portion of the first display are disposed on a same plane.

A separable cover is formed on the main body panel housing and the cover is provided with an input key. The cover can be formed in a foldable type.

When the main body panel housing is coupled to the sub-panel housing, at least one of the main and sub displays slides to be disposed adjacent to another display.

The sub-panel housing comprises outer coupling means to which electronic devices can be coupled. The electronic devices comprise a desktop monitor on which the sub-panel housing is coupled by the outer coupling means.

The main body panel housing may further comprise an auxiliary display that can be viewed even when the cover covers the main body panel.

The sub-panel housing may stack on a front or rear portion of the main body panel housing and the coupling means is formed on the front or rear portion of the panel housings.

BRIEF DESCRIPTION OF DRAWINGS

FIG. 28b is an enlarged view illustrating a locking device of FIG. 28a;

BEST MODE FOR CARRYING OUT THE INVENTION

Preferred embodiments of the present invention will be described hereinafter in conjunction with accompanying drawings.

The present invention provides a portable multi-display device having at least two flat displays connected to be adjacent to each other so as to define a large-sized screen effect. As the flat display panels, LCDs, FEDs, PDPs, electric papers and the like can be used.

Embodiment 1

Figure 1:
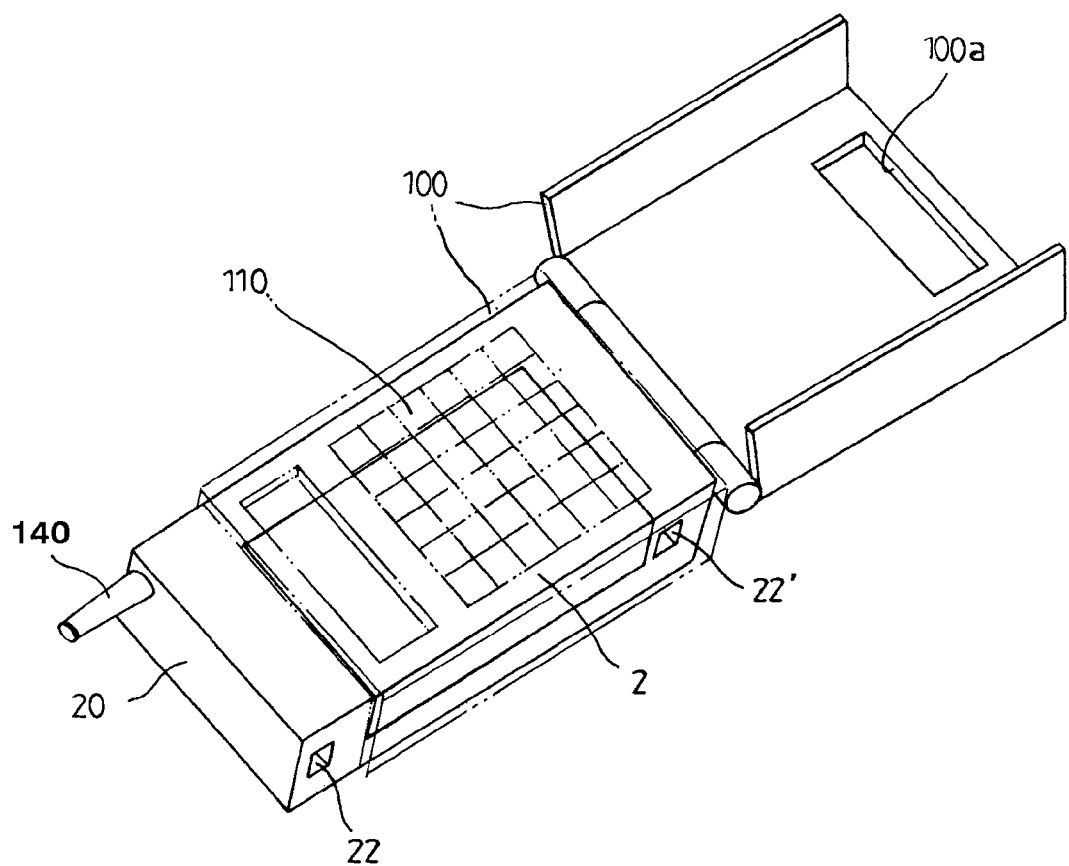
FIG. 1 is a view illustrating a portable multi-display device according to an embodiment of the present invention.

FIG. 1 shows a portable multi-display device of the present invention.

As shown in the drawing, the inventive multi-display device comprises a main body panel housing 20 and a display 2. An antenna enabling transmitting and receiving information may be further provided. The display 2 is designed expanding to one side end of the main body panel housing 20.

In addition, the main body panel housing 20 is provided at its one sidewall with a pair of coupling means 22 and 22'. The main body panel housing 20 can be coupled to a sub-panel housing by the coupling means.

The multi-display device further comprises a flip cover 100 for covering the display 2. The flip cover 100 is provided at its outer surface with input keys 110 and a cover window 100a so that a part of the display can be viewed through the cover window 100a when the display 2 is covered by the flip cover 100. The flip cover 100 is designed to cover the sidewall of the display. A state where the display is covered by the flip cover 100 is shown in a broken line of FIG. 1.

Figure 2:
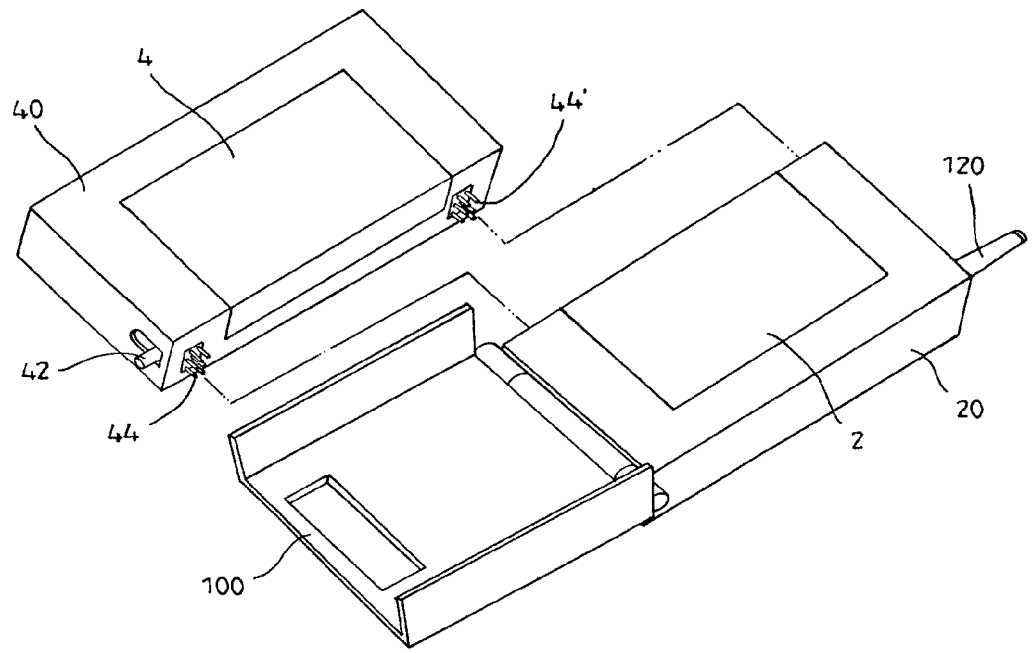
FIG. 2 is a view illustrating sub-panel housing to be connectable.

FIG. 2 shows a sub-panel housing capable of coupling to the main body panel housing.

As shown in the drawing, the sub-panel housing 40 capable of coupling to the main body panel housing 20 is provided with a pair of coupling means 44 and 44' for coupling to the main body panel housing 20. The coupling means 44 and 44' is designed to be projected out of and inserted in the panel housing 40 by a lever 42.

Figure 3:
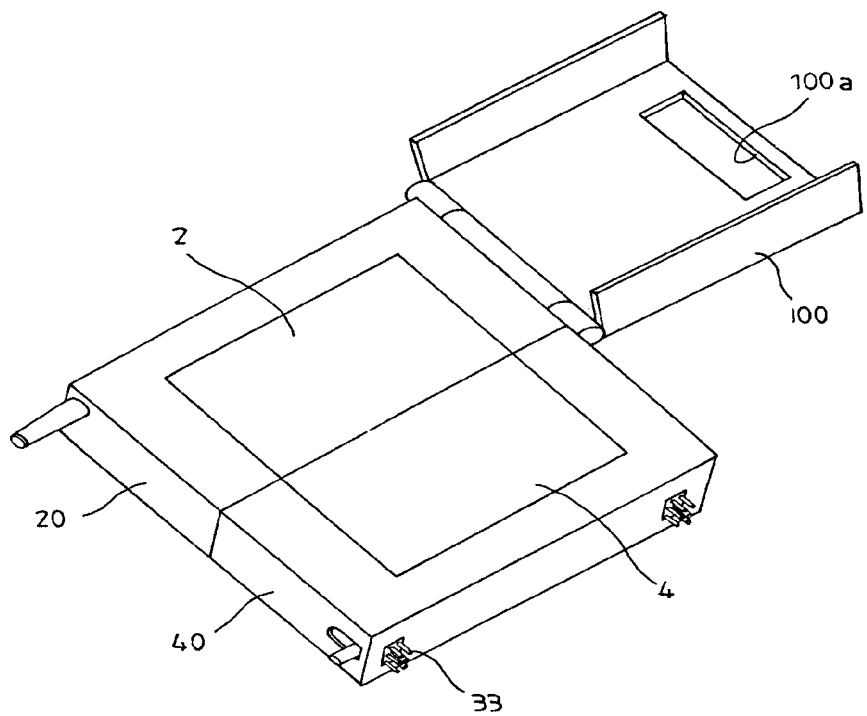
FIG. 3 is a view of a portable multi-display device where two panel housings are connected.

FIG. 3 shows a view where the main body panel housing is coupled to the sub-panel housing.

As shown in the FIG. 3, when the main body panel housing 20 is coupled to the sub-panel housing 40, the first and second displays 2 and 4 contact each other. As a result, the border between the displays 2 and 4 is minimized, whereby the two displays 2 and 4 are driven as if one display.

In addition, cover coupling means for connecting the cover 100 to the main body panel housing 20 has a shaft formed in male and female structures so that the cover 100 can be removable from the main body panel housing 20.

Figure 4:
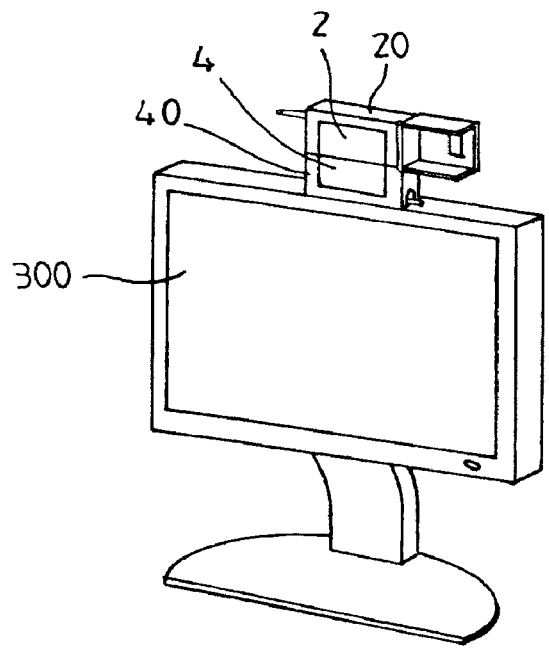
FIG. 4 is a view illustrating a portable display device of the present invention is connected to other information device.

The panel housing 40 may be further provided with outer coupling means 33 for connecting to another information device. As shown in FIG. 4, the display device of the present invention can be coupled on a top of a monitor 300, which is another information device, by the outer coupling means 33. Needless to say, provided on the top of the monitor 300 is coupling means for detachably coupling to the outer information device.

Figure 5:
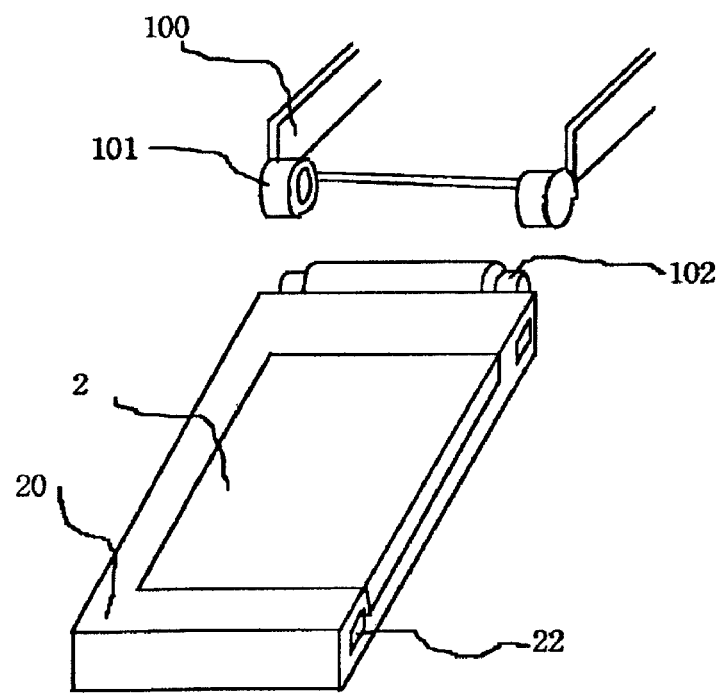
FIG. 5 is a view illustrating a separation structure of a cover.

FIG. 5 shows a removing structure of the cover.

As shown in the drawing, the shaft for connecting the cover 100 to the panel housing 20 comprises a projection shaft 102 and a cap shaft 101. To couple the cover 100 to the panel housing 20, the cap shaft 101 is enfolded around the projection shaft 102. The cap shaft 101 and the projection shaft 102 are designed in a circular shape so that they can rotate when they are coupled.

Figure 6:
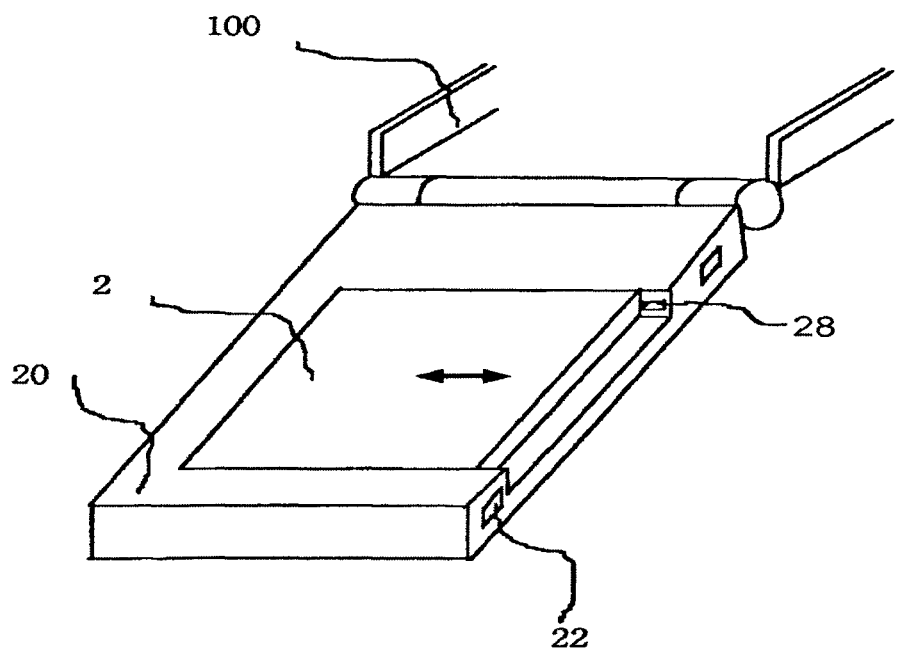
FIG. 6 is a view of a portable multi-display device according to another embodiment of the present invention.

FIG. 6 shows another example of the display device of the present invention.

In this example, the portable display device comprises the main panel housing 20 and the sub-panel housing 40. When the main body and sub-panel housings 20 and 40 are coupled, one of the first and second displays 2 and 4 slides such that the first and second displays 2 and 4 disposed to be adjacent at their one sides. The main body panel housing 20 is provided with a sliding groove 28, and the first display 2 is provided with a projection (not shown) so that the first display 2 can slides along the sliding groove 28.

Figure 7:
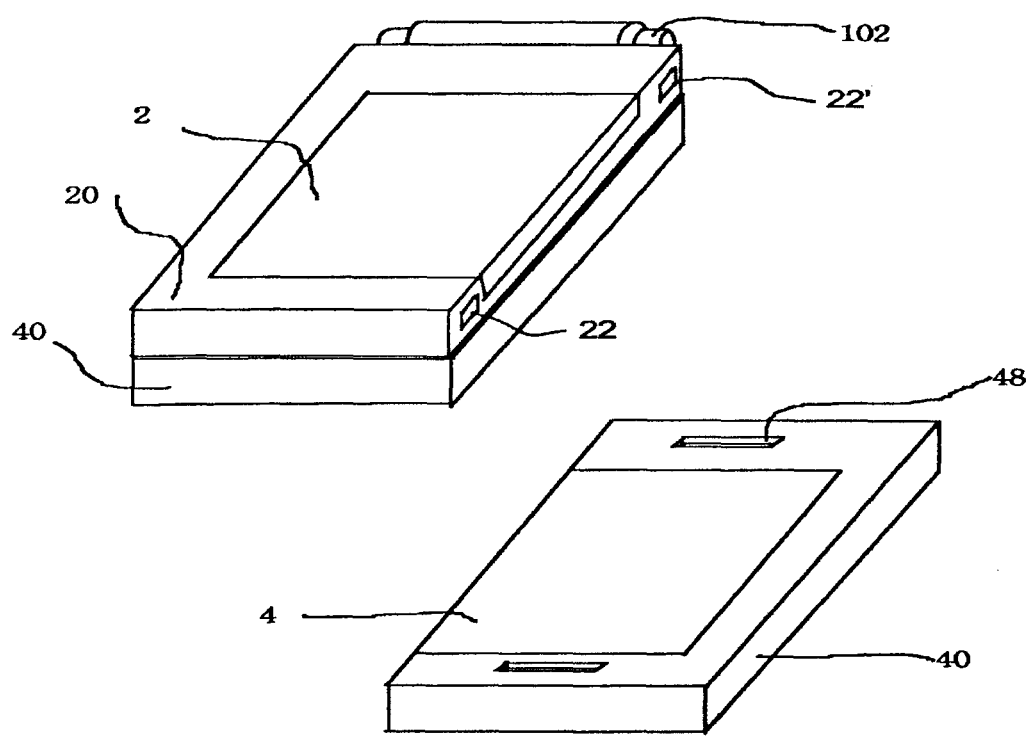
FIG. 7 is a view of another example of a panel housing connection state.

FIG. 7 shows another example of a coupling state of the panel hosing.

In this example, the sub-panel housing 40 is stacked on front or rear surface of the main body panel housing 20. That is, as shown in FIG. 7, formed on the front surface of the sub-panel housing 40 is a coupling groove 48 by which the sub-panel housing 40 is coupled to the rear surface of the main body panel housing 20. Although omitted in the drawing for the descriptive convenience, a coupling projection for coupling to the coupling groove 48 of the sub-panel housing 40 is formed on the rear surface of the main body panel housing 20.

Embodiment 2

As shown in FIG. 1, when the main body panel housing 20 and the sub-panel housing 40 are disassembled, side portions of the displays 2 and 4 are exposed at one side portions of the panel housings 20 and 40. In this embodiment, to protect the exposed side portions of the displays 2 and 4, protecting means is provided on the side portions of the panel housings 20 and 40.

Figure 8A:
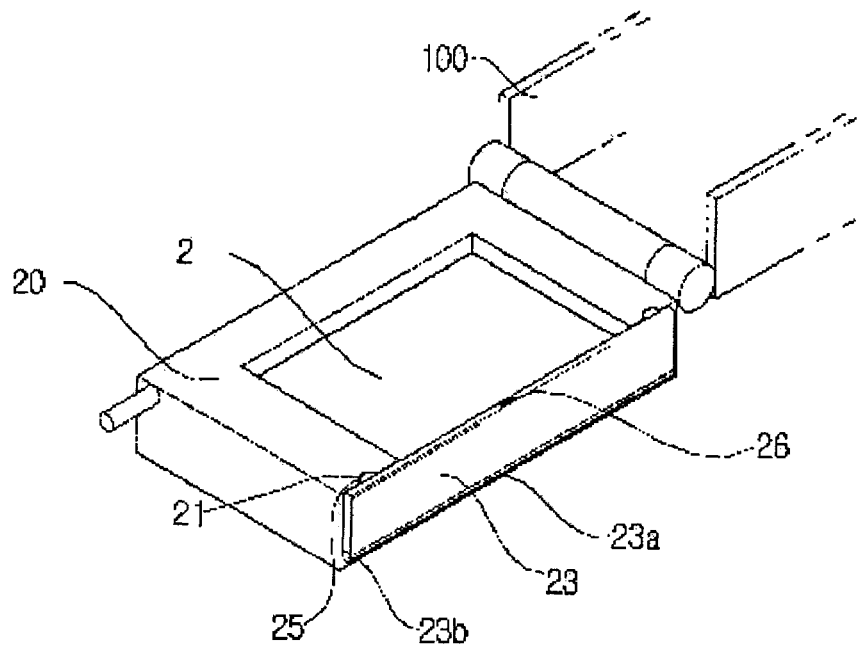
FIGS. 8a and 8b are views illustrating protecting means of a main body panel housing.
Figure 8B:
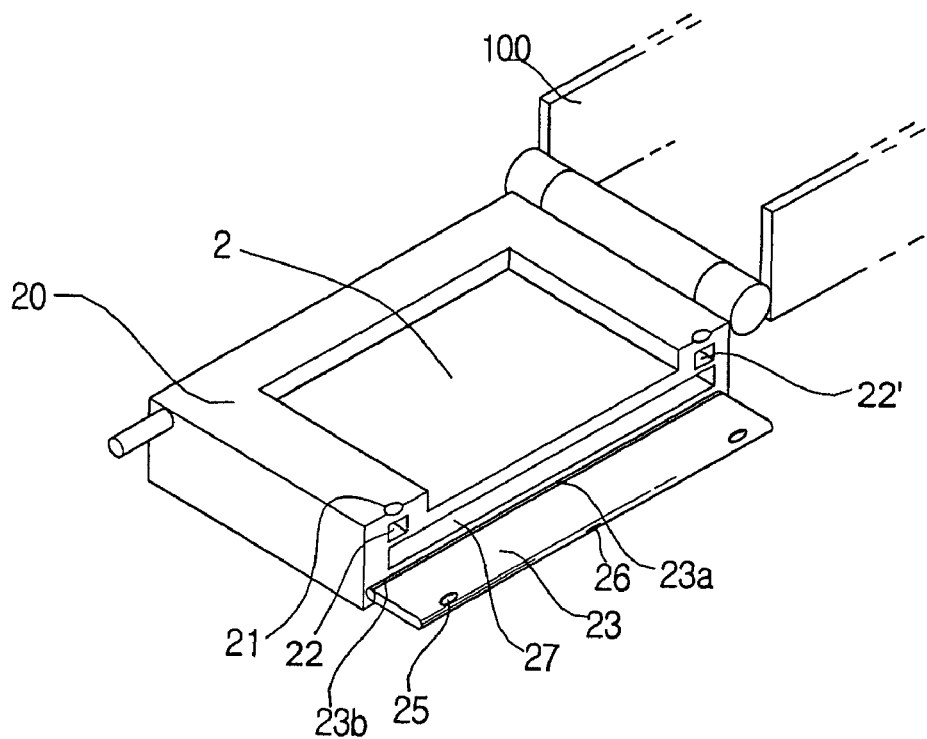

FIGS. 8a and 8b show the protecting means of the main body panel housing 20, in which FIG. 8a shows a state in which the protecting cover 23 is folded, and FIG. 8b shows a state in which the protecting cover is unfolded. The protecting covers 23 and 43 are used in this embodiment as the protecting means.

The protecting cover 23 of the main body panel housing 20 is designed to be foldable. The protecting cover 23 can be separated in two shaft portions. A cover shaft 23a synchronizes with the protecting cover 23 and a panel housing shaft 23b is fixed on the panel housing 20.

A grip 26 formed in a stripe groove is formed on the protecting cover 23 so that it is convenient to open and close the protecting cover 23. In addition, when the protecting cover 23 is unfolded on the main body panel housing 20, a coupling projection 25 of the protecting cover 23 is interlocked with a coupling groove 21 of the main body panel housing so that the protecting cover 23 can be securely coupled on the main body panel housing 20.

In addition, a cover receiving space 27 is defined on the side portion of the main body panel housing 20 where the protecting cover 23 is provided so as to receive the protecting cover 43 of the sub-panel housing 40. Formed on the panel housing 20 is also coupling means 22 and 22' for coupling to the sub-panel housing 40.

Figure 9A:
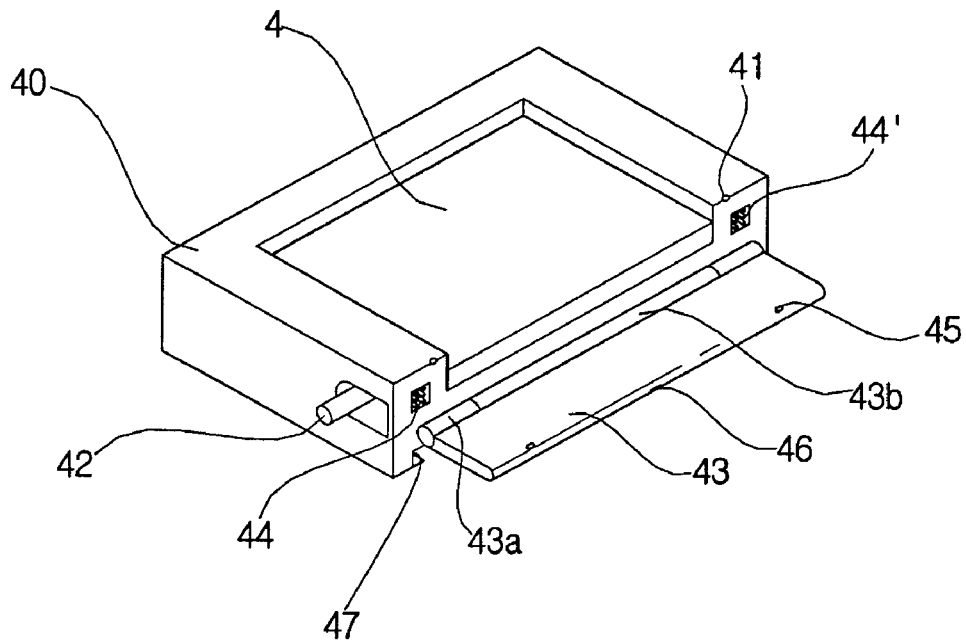
FIGS. 9a and 9b are views illustrating protecting means of a sub-panel housing.
Figure 9B:
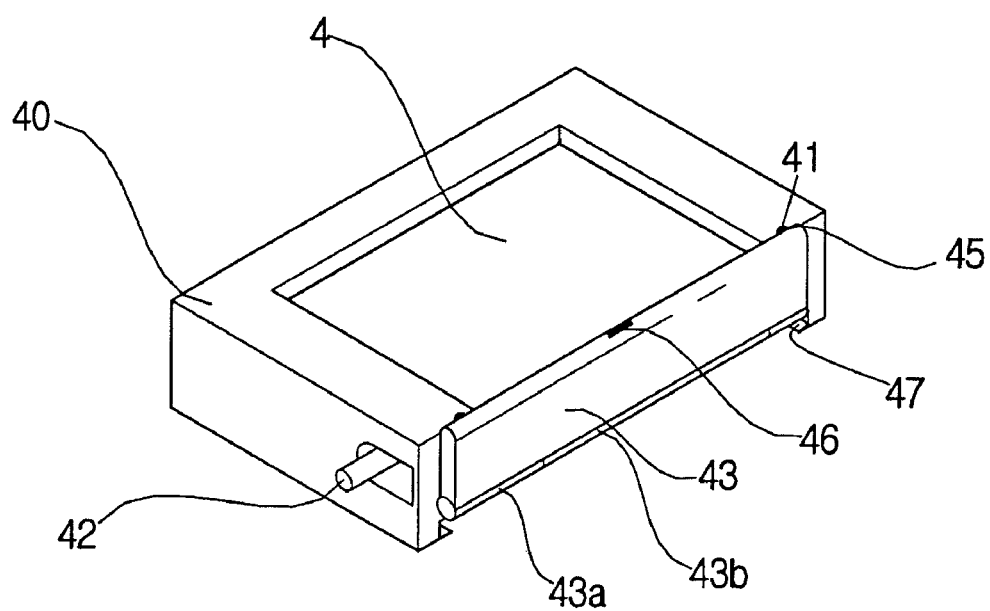

FIGS. 9a and 9b shows the protecting means of the sub-panel housing 40, in which FIG. 9a is a state where the protecting cover 43 of the sub-panel housing 40 is unfolded, and FIG. 9b is a state where the protecting cover 43 is folded.

The protecting cover 43 of the sub-panel housing 40 is also provided with a groove-shaped grip 46, and the panel housing 40 is provided with a coupling groove 41. In addition, formed on a lower end of the sub-panel housing 40 is a cover receiving space 47 for receiving the protecting cover 23 of the main body panel housing 20. A cover shaft 43a of the protecting cover 43 synchronizes with the protecting cover 43, and a panel housing shaft 43b is fixed on the panel housing 40.

Figure 10:
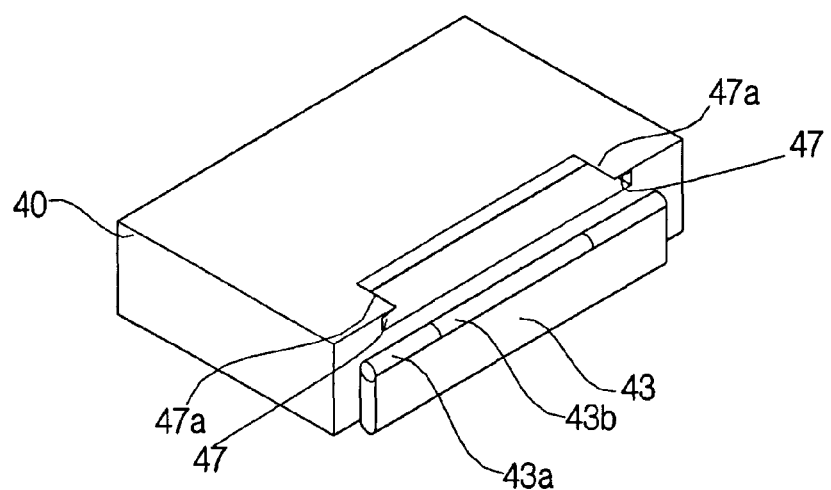
FIG. 10 is a view illustrating a cover receiving space.

FIG. 10 shows the cover receiving space more in detail.

The cover receiving space may be defined on a side portion of the panel housing as shown in FIG. 8b or on a lower end of the panel housing as shown in FIG. 10. The cover receiving space 47 is provided with a guide rail 47a along which the protecting cover 23 of the main body panel housing 20 slides.

Figure 11:
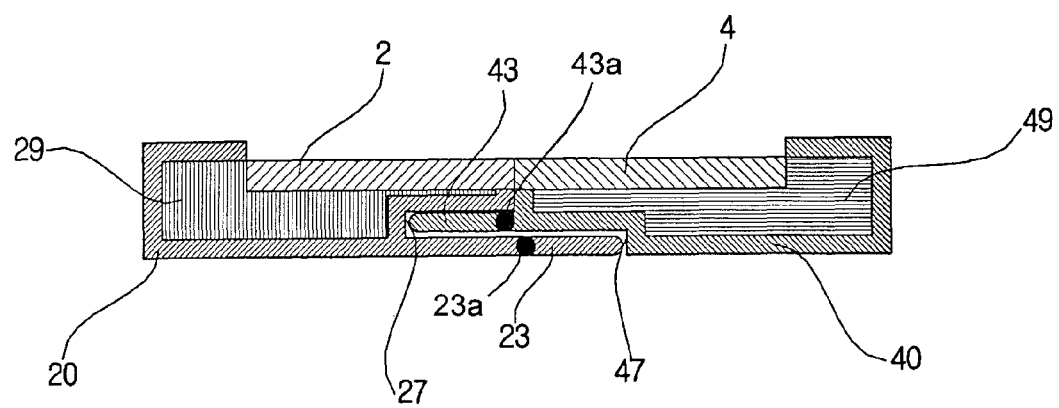
FIG. 11 is a sectional view of panel housings connected to each other.

FIG. 11 shows a panel housing coupling state.

A variety of parts 29 and 49 such as a CPU and a circuit board is provided in the panel housing.

The protecting cover 23 of the main body panel housing 20 is received in the cover receiving space 47 defined on the sub-panel housing 40, and the protecting cover 43 of the sub-panel housing 40 is received in the cover receiving space 27 of the main body panel housing 20.

In addition, an example having two panel housings is embodied in this embodiment, three or more panels housings can be provided in a same concept.

Figure 12A:
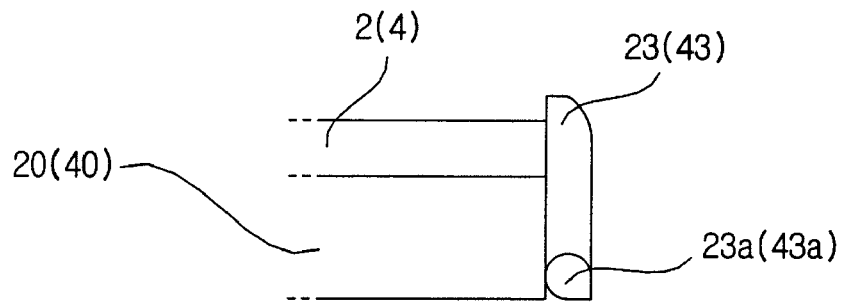
FIGS. 12a and 12b are views illustrating an end portion of a protecting cover.
Figure 12B:
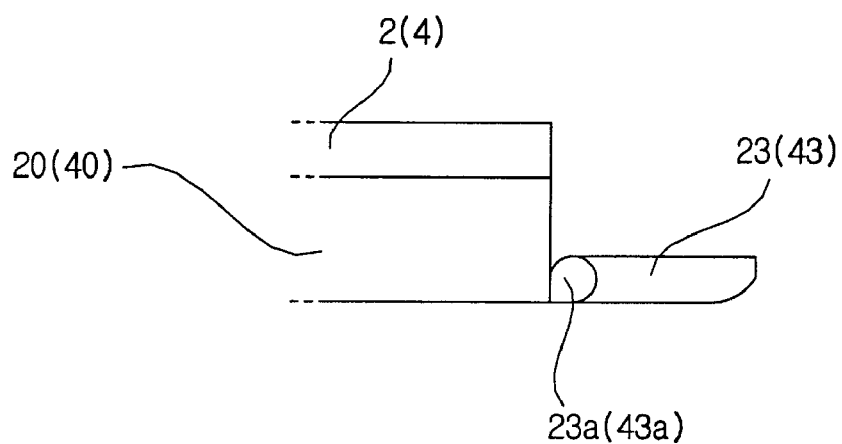

FIGS. 12a and 12b show a section of the protecting covers 23 and 43, in which FIG. 12a is a state where the protecting cover is folded and FIG. 12b is a state where the protecting cover is unfolded.

In this example, there is provided a hooking means for preventing the panel housings 20 and 40 from bending more than 90° when the protecting covers 23 and 43 are unfolded. As the hooking means, a section of one of the cover shafts 23a and 43a is formed at a right angle. In addition, when the protecting covers 23 and 43 are folded, the protecting covers 23 and 43 are designed to be higher than the surfaces of the displays 2 and 4 when the protecting covers 23 and 43 are folded, thereby enhancing the protecting efficiency for the displays 2 and 4.

Figure 13A:
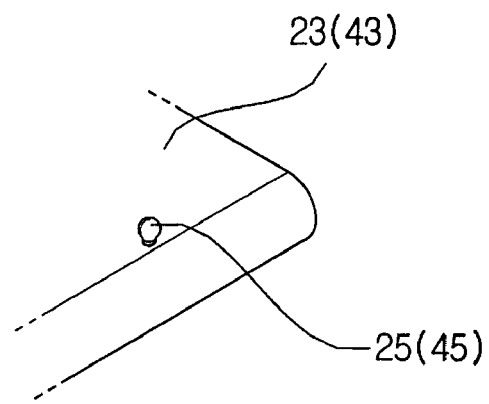
FIGS. 13a and 13b are views illustrating another example of a coupling projection and a coupling groove of a protecting cover.
Figure 13B:
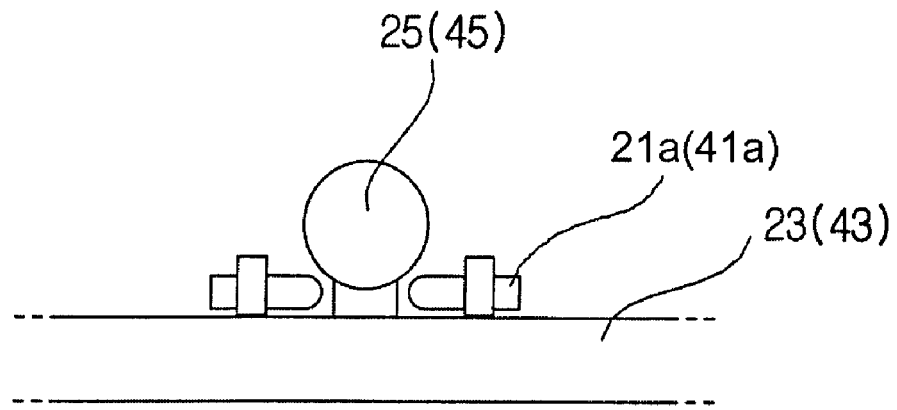

FIGS. 13a and 13b shows another examples of the coupling projection and the coupling groove of the protecting cover, in which FIG. 13a shows the coupling projections 25 and 45 with a concave structure, and FIG. 13b shows a locking device.

In this example, the coupling projections 25 and 45 are designed to be the concave structure, and the locking devices 21a and 41a are provided in the coupling grooves 21 and 41. The coupling projections 25 and 45 are fixed by elastic force of the locking devices 21a and 41a.

Figure 14A:
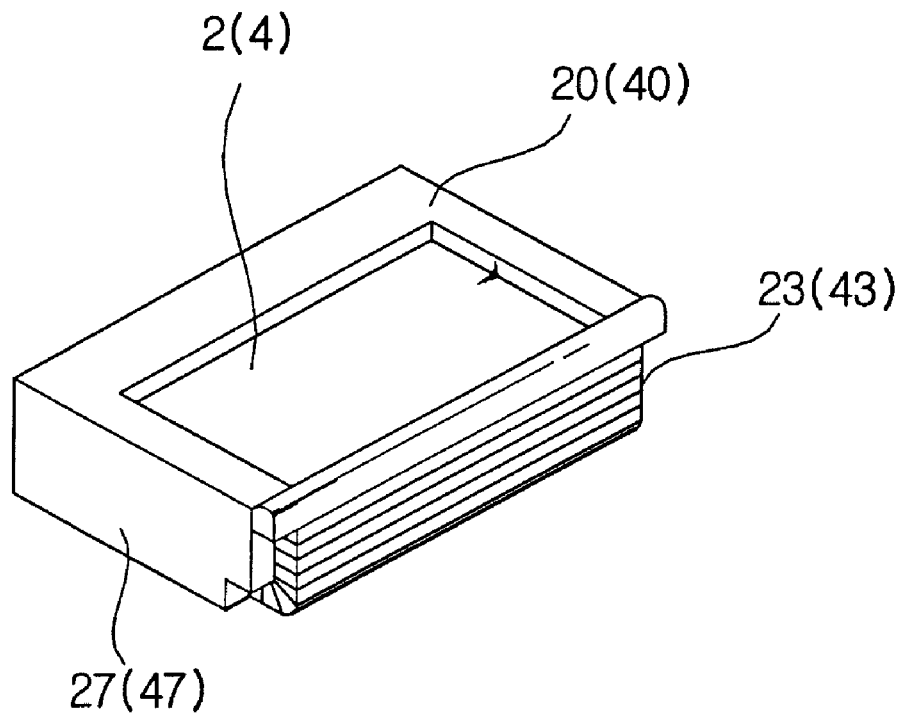
FIGS. 14a and 14b are views illustrating another example of protecting means.
Figure 14B:
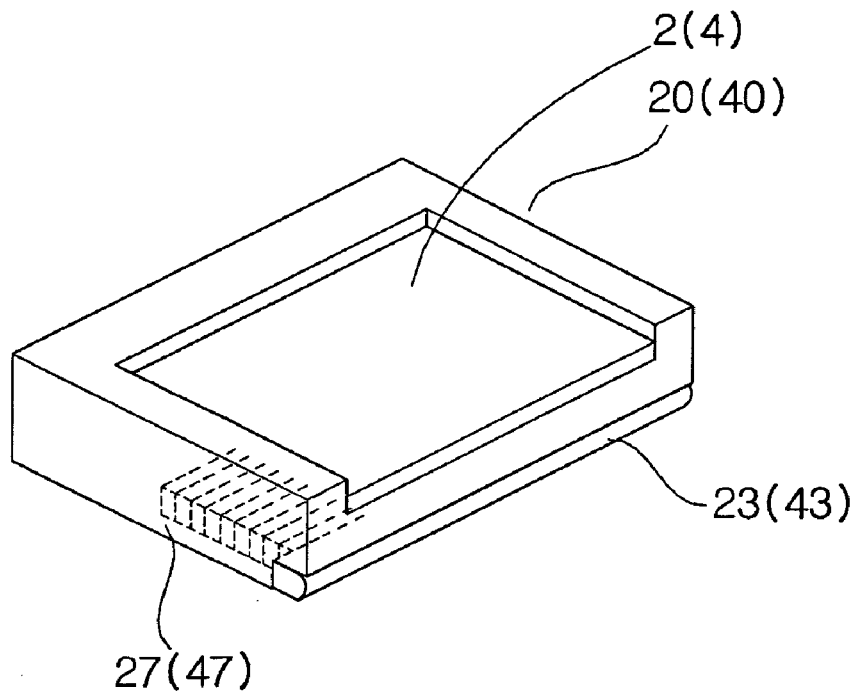

FIGS. 14a and 14b shows another example of the protecting means. The protecting covers 23 and 43 is designed to, when they are folded, protect the exposed side portions of the displays 2 and 4 and to, when they are unfolded, locate on a lower end of the panel housings.

FIG. 14a shows a state where the protecting covers 23 and 43 are folded, and FIG. 14b shows a state unfolded. As shown in the drawing, the protecting covers 23 and 43 are formed in a drawer-type so that the protecting covers 23 and 43 can be withdrawn out of and received in the lower end of the panel housings.

The protecting covers 23 and 43 should be designed such that they can be gently located on an inner portion of an extension line of the side surface of the panel housings 20 and 40 when they are received in the cover receiving spaces 27 and 47. That is, when two panel housings are coupled with their adjacent side portions contacting each other, the protecting covers 23 and 43 should not affect on they coupling.

Figure 15A:
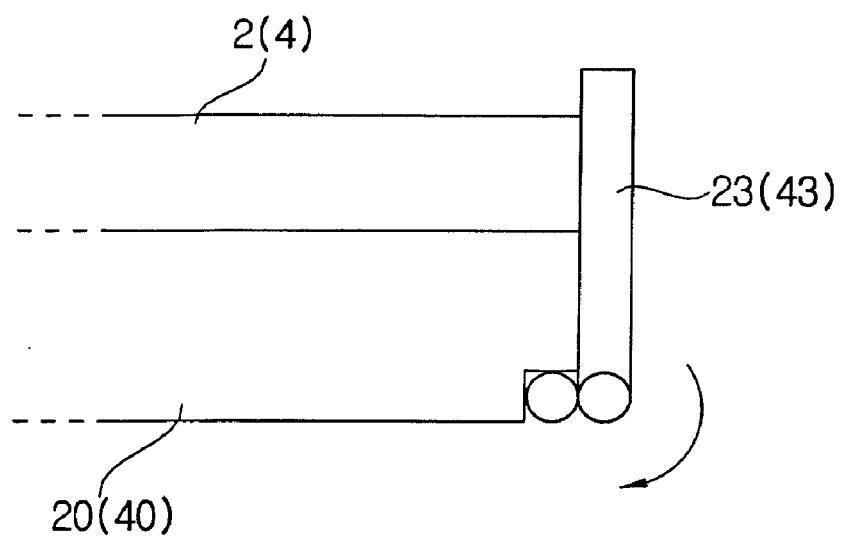
FIGS. 15a and 15b are views illustrating another example of protecting means.
Figure 15B:
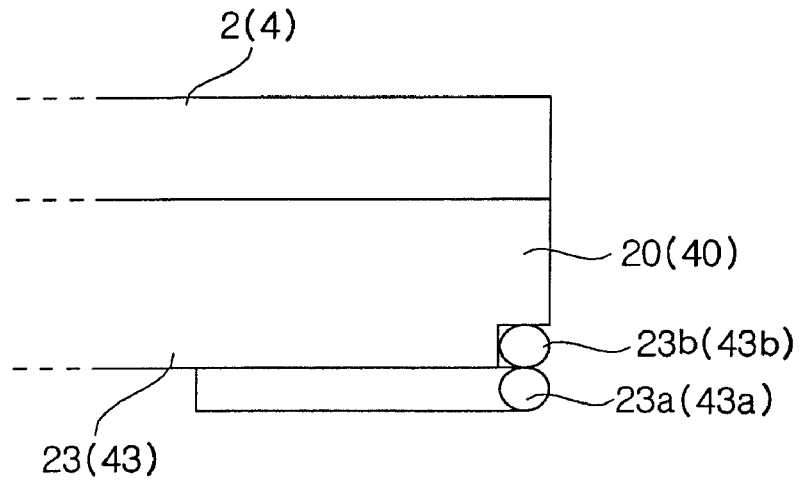

FIGS. 15a and 15b show another example of the protecting means.

In this example, the protecting covers 23 and 43 pivots to be located on a lower end of the panel housings. That is, the protecting covers 23 and 43 are to be closely located on the lower end the panel housing when they are unfolded. The protecting covers 23 and 43 are designed to be pivotable at more than 2700 so that they can be attached on the lower end of the panel housings 20 and 40.

In addition, for the pivoting operation of the protecting covers 23 and 43, there are provided panel housing shafts 23b and 43b connected to the panel housings and cover shafts 23a and 43a connected to the protecting covers. When the protecting covers 23 and 43 are attached on lower ends of the panel housings, the protecting covers 23 and 43 and the shafts are located on an inner portion of the extension line of the side portions of the panel housings 20 and 40.

Figure 16:
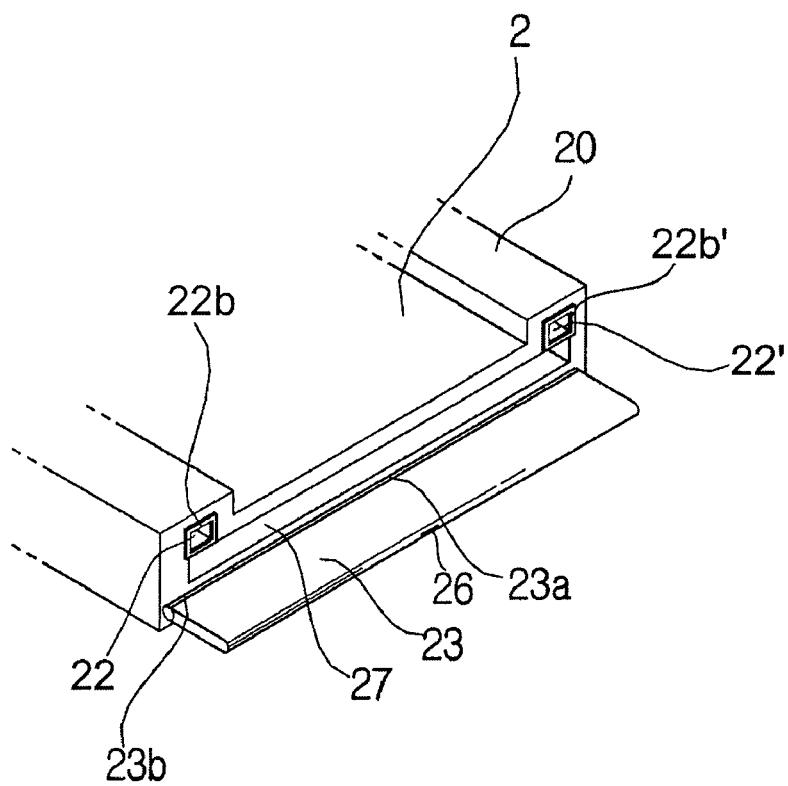
FIG. 16 is a view illustrating a method for protecting connecting means of the panel housings from moisture.

FIG. 16 shows a method for protecting the coupling means of the panel housing from moisture.

As shown in the drawing, elastic seal caps 22b and 22b' are fitted in rectangular grooves of the coupling means 22 and 22' provided on the main body panel housing 20. At this point, the elastic seal caps 22b and 22b' are formed of elastic material such as rubber. The elastic seal caps 22b and 22b' are fitted protruding so that the seal effect can be enhanced while being reduced in its volume. Accordingly, when the protecting cover 23 or the sub-panel housing 40 is attached on a side portion of the main body panel housing 20, a seal effect for protecting the coupling means from moisture can be obtained. In addition, the seal caps 22b and 22b' may be provided on the protecting cover 23 and can be provided on the sub-panel housing 40 in an identical manner.

Embodiment 3

The portable multi-display device of the present invention is provided at its side portion with an opening for mounting the display in the panel housing. The display is mounted on the side portion of the panel housing on which the opening is formed.

Figure 17:
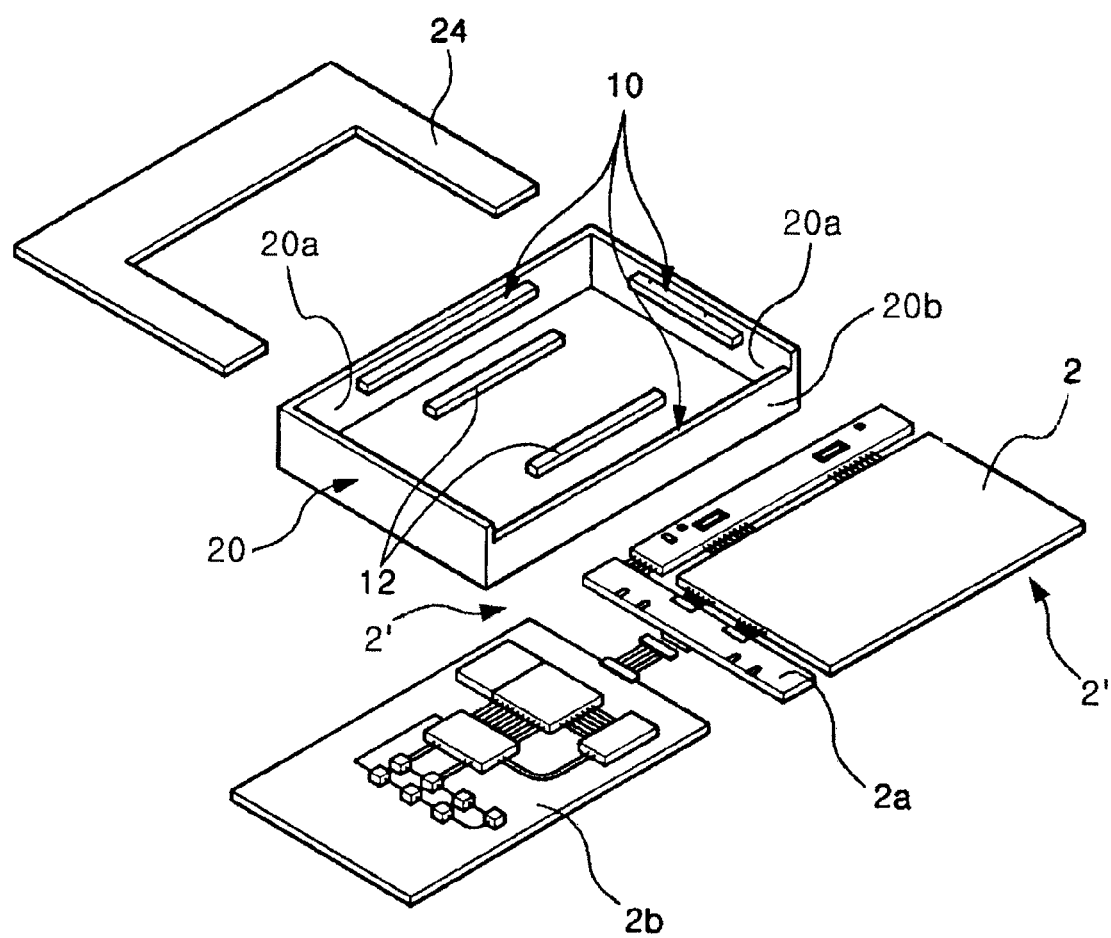
FIG. 17 is a view illustrating a main body panel housing provided at its side portion with an opening.

FIG. 17 shows a main body panel housing provided with the opening.

As shown in the drawing, the panel cover 24 is detachably coupled to an upper end of the main body panel housing 20. An opening is formed on a side portion 20b of the main body panel housing 20 provided with a joint portion 2'. The display 2 and the display drive circuit 2a are disposed on the side portion 20b provided with the opening. In addition, another side portion 20a of the panel housing is provided with a display support 10 for fixedly supporting the display 2. The main body panel housing 20 is provided at its lower end with a lower support 12 for supporting a main body circuit board 2b.

Figure 18:
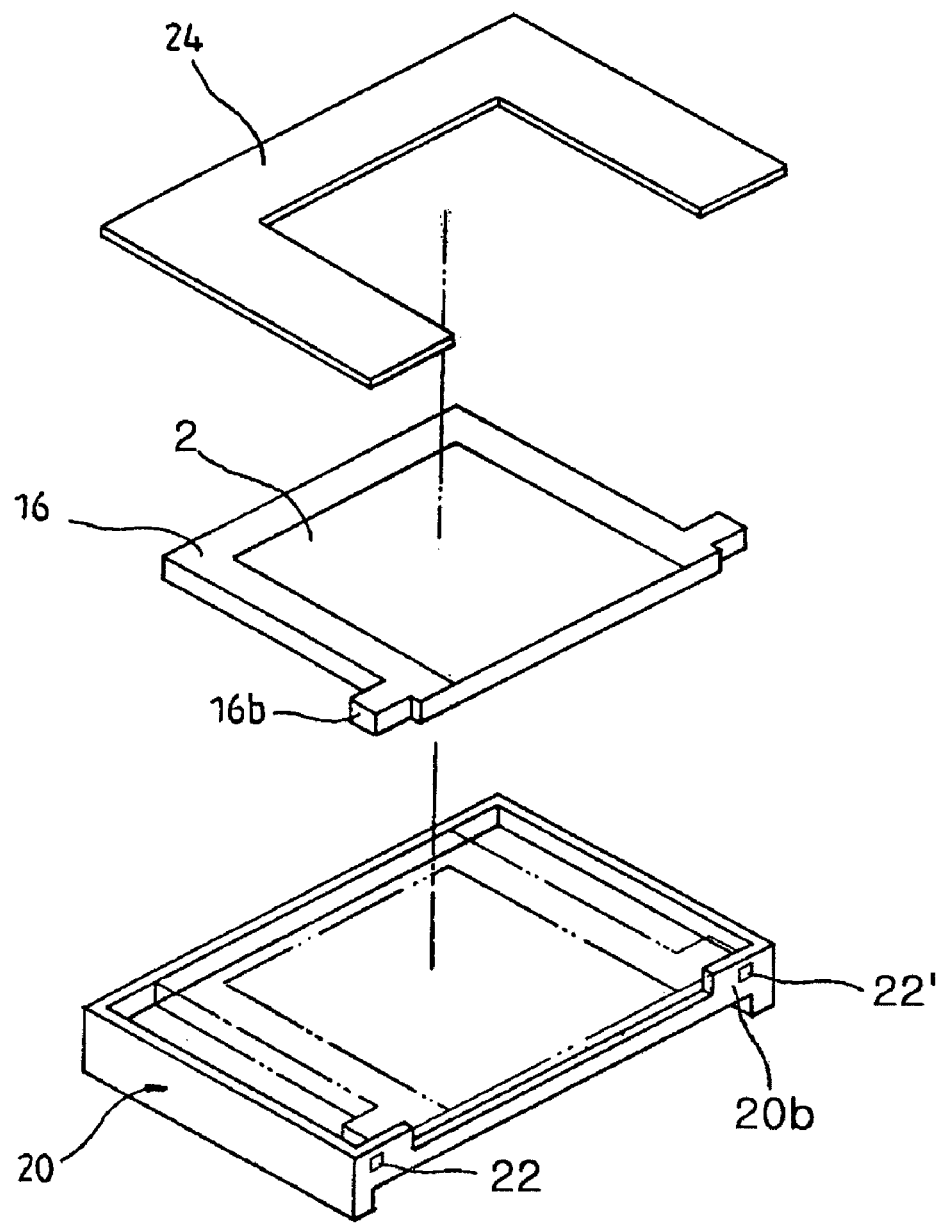
FIG. 18 is a view illustrating a method for fixing a display on a panel housing.

FIG. 18 shows a method for fixing the display on the panel housing.

The display 2 is enclosed by a chassis 16 provided with a fixing member 16b for fixing the chassis 16 and the display 2 on the main body panel housing 20. When the chassis 16 is fixed, the panel cover 24 covers a non-display area of the display 2. As a result, the display 2 is mounted in the opening formed on the side portion 20b of the panel housing 20 provided with the coupling means 22 and 22', while being exposed through the opening.

Figure 19A:
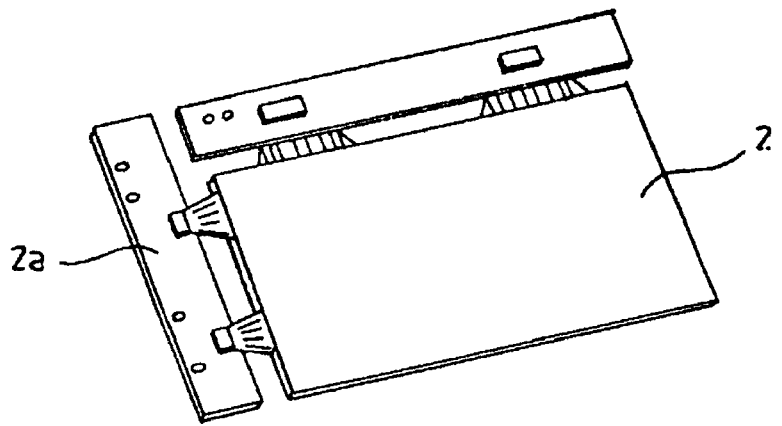
FIGS. 19a and 19b are views illustrating a display mounted on a chassis.
Figure 19A:
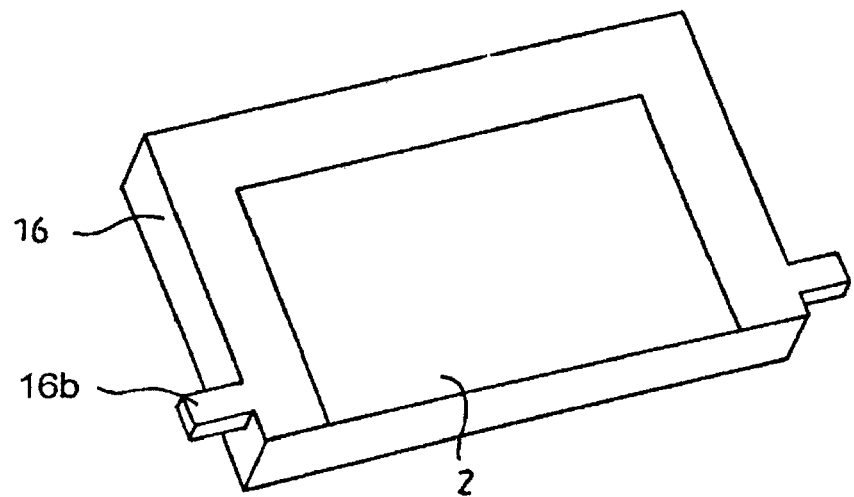
Figure 19B:
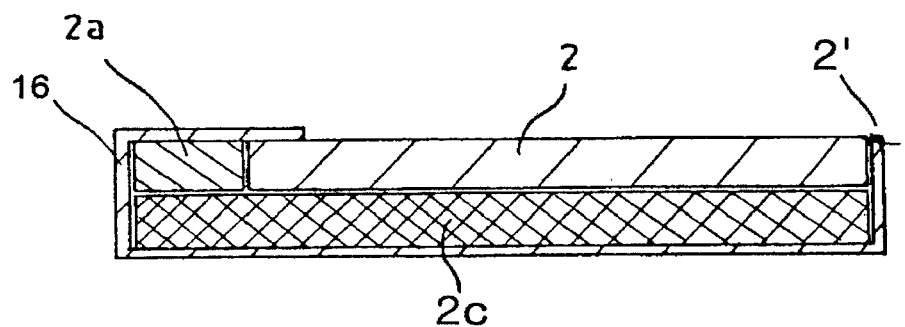

FIGS. 19a and 19b show the display mounted on the chassis.

As shown in FIG. 19a, the display 2 together with the display drive circuit 2a is mounted inside the chassis 16. Although omitted in the drawing, a backlight system may be mounted inside the chassis 16.

FIG. 19b is a sectional view of FIG. 19a. A display assembly having the display 2, the display drive circuit 2a and the backlight system 2c is mounted inside the chassis 16. The integrated chassis 16 encloses the display assembly. The integrated chassis 16 is not a single body but divided into a body and a cover that are assembled to each other by a screw so as to define a single unit. The chassis 16 is made of a plastic, a metal plate, or an aluminum plate.

In addition, a side portion of the display 2 is only enclosed by the chassis 16 in a portion of the joint portion 2' so as to minimize the joint portion when two displays is driven as if a single display by contacting each other.

Figure 20:
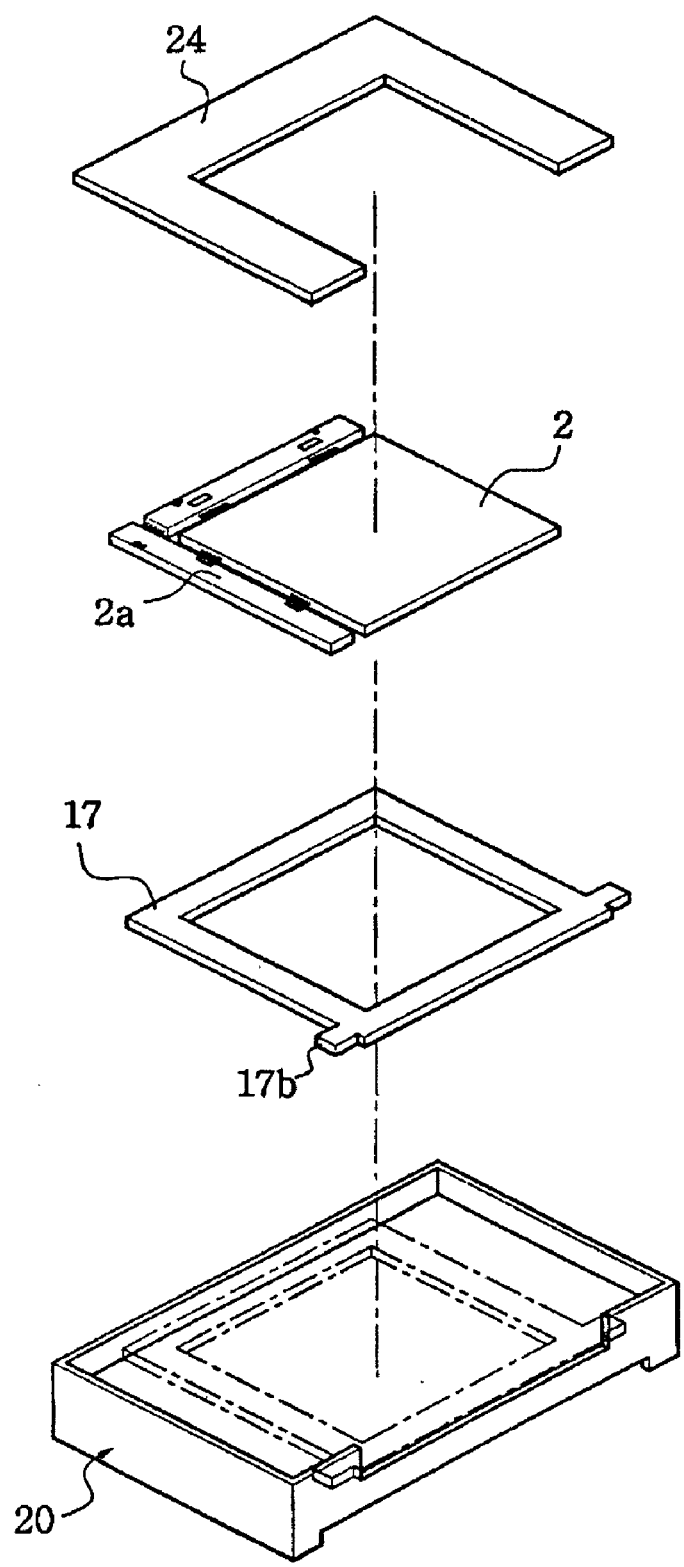
FIG. 20 is a view illustrating another example of a display mounting.

FIG. 20 shows another example of a display mounting.

In this example, the display 2 and the display drive circuit 2a are mounted on the plate type support 17 that is mounted on the panel housing 20. The support 17 is provided with a fixing projection 17b by which the panel housing 20 is fixed.

The support 17 is shown as a rectangular shape in FIG. 20, not limiting the present invention. That is, the support 17 is not limited to the rectangular shape.

Figure 21A:
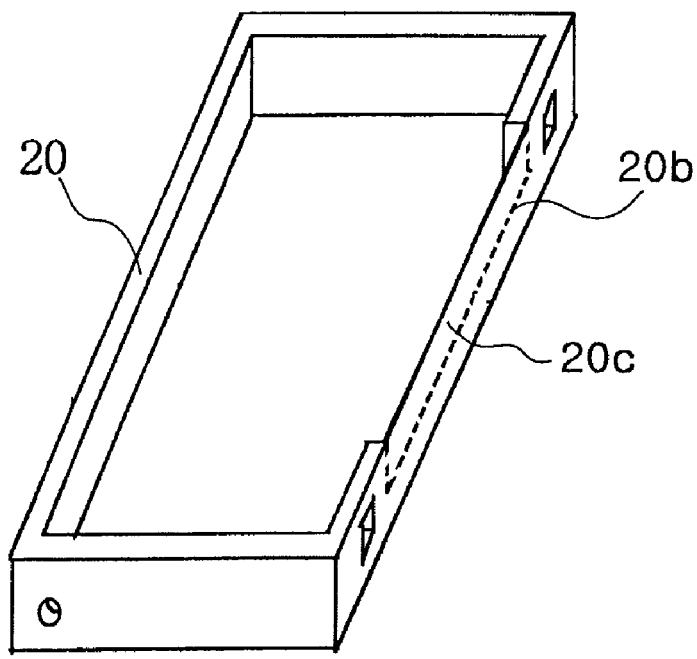
FIGS. 21a and 21b are views illustrating panel housings provided with a side protecting film.
Figure 21B:
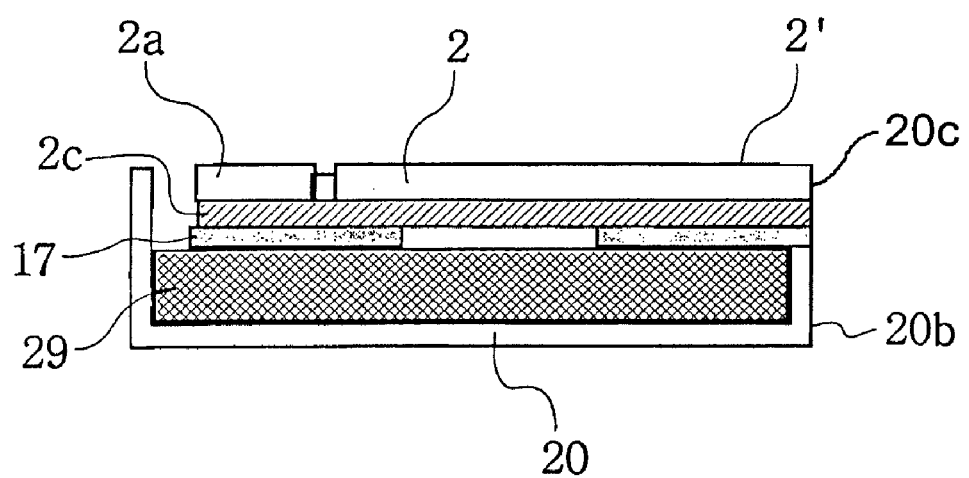

FIGS. 21a and 21b show a panel housing provided with a side protecting film.

FIG. 21a is a schematic view of the panel housing 20 having the side protecting film 20c. For the convenience in the description, other parts are omitted but only the panel housing 20 is illustrated. In FIG. 21a, the opening is depicted in a dotted-line.

The side protecting film 20c is formed of a thin resin film, a plastic film, or a thin metal plate which is different from that of the panel housing 20. Preferably, the thickness of the side protecting film 20c is less than 1 mm.

FIG. 21b is a sectional view of the panel housing 20 having the side protecting film 20c. The side protecting film 20c is provided on the joint side portion 20b of the panel housing 20 to protect the display 2 exposed through the panel housing 20.

A variety of parts and a main body circuit board 29 is loaded in the panel housing 20. In addition, the display assembly is loaded on the support 17 and located on the upper end of the panel housing side portion 20b having the joint portion 2'.

Figure 22:
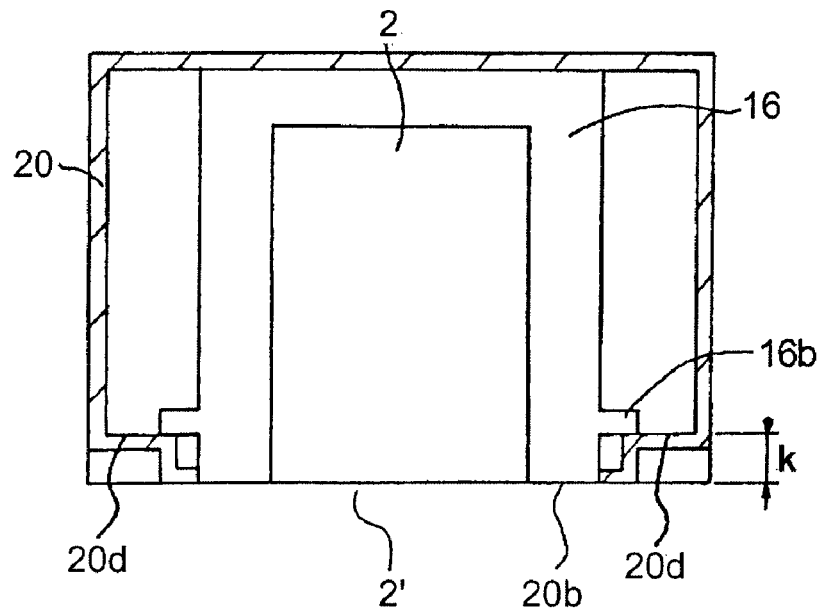
FIG. 22 is an upper view illustrating a state where a display is fixed to a panel housing by a fixing member.

FIG. 22 shows an upper view of the panel housing to which the display is fixed by the fixing projection. A manner for disposing the joint portion 2' of the display 2 on an extension line of the joint side portion 20b of the panel housing 20. The extension line can be considered to be variable within a range of ±1 mm.

In addition, a protecting plate or a protecting film may be provided to protect the side portion of the display 2. Accordingly, the side portion of the main body panel housing 20 and the side portion of the protecting plate or film may be located on an identical line.

As shown in FIG. 22, the display 2 may be removed away through the opening of the panel housing 20. Therefore, in the present invention, a fixing member 16b fixed on the hooking means 20d of the panel housing 20 is provided.

In FIG. 22, the fixing member 16b is formed in a projection type, not limiting the present invention. That is, the fixing member 16b can be formed in a screw type fixed on the panel housing 20. At this point, the hooking means is formed in a screw groove.

As shown in FIG. 22, a distance k from the display side portion of the joint portion 2' to the fixing member 16b is identical to that from panel housing side portion 20b to the hooking means 20d.

Figure 23:
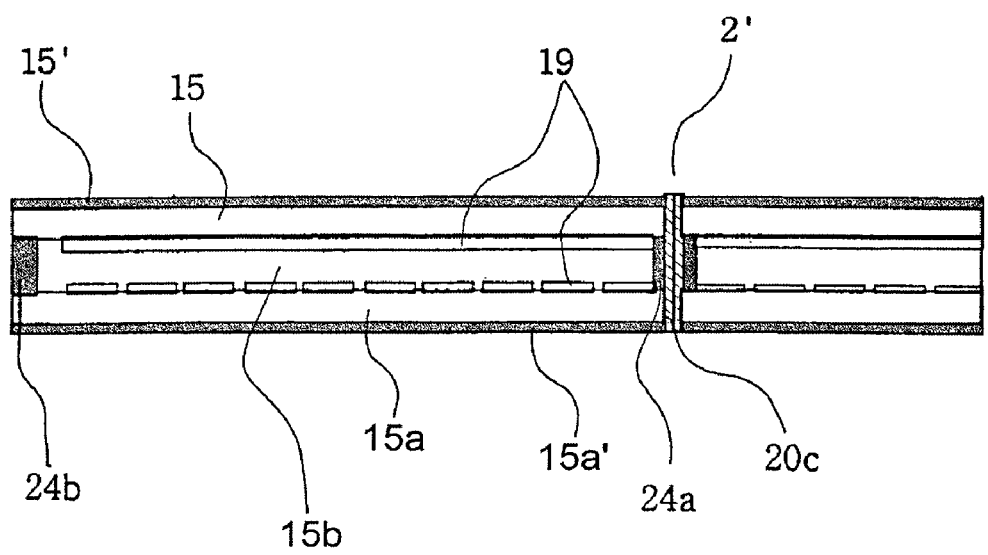
FIG. 23 is a sectional view illustrating a state where two displays disposed adjacent to each other.

FIG. 23 is a sectional view illustrating two displays contacting each other at their one side portion.

An LCD, which is one of the flat displays, comprises upper and lower substrates 15 and 15a disposed opposing each other. Transparent electrodes 19 are coated on the substrates 15 and 15a. In addition, a liquid crystal layer 15b is disposed between the transparent electrodes 19. Polarizers 15' and 15a' are attached on the outer surfaces of the substrates 15 and 15a. When the flat display is an EL, a single substrate may be provided.

As shown in FIG. 23, the upper and lower substrates 15 and 15a are assembled and sealed by sealants 24a and 24b. At this point, the sealant 24a of the joint portion 2' is disposed adjacent to a pixel electrode 19.

The sealant 24a of the joint portion 2' should be designed having a minimized width less than, for example, about 0.8 mm. A side portion protecting film 20c is attached around the joint portion sealant 24a (when the display is enclosed by the chassis 16, the chassis 16 functions as the side portion protecting film 20c). At this point, the thickness of the side portion protecting film 20c is preferably less than 0.8 mm. Accordingly, in the present invention, when more than two displays realize a single screen by being adjacent to each other, the joint portion which is the non-display area becomes less than 3.2 mm, thereby providing an effect of a single screen using two adjacent displays.

Embodiment 4

When the main body panel housing 20 is coupled to the sub-panel housing 40, a coupling detecting sensor of the main body panel housing 20 detects a projection sensor of the sub-panel housing 40, and then the CPU disposed in the main body panel housing 20 automatically detects the coupling state of the panel housings 20 and 40.

Figure 24:
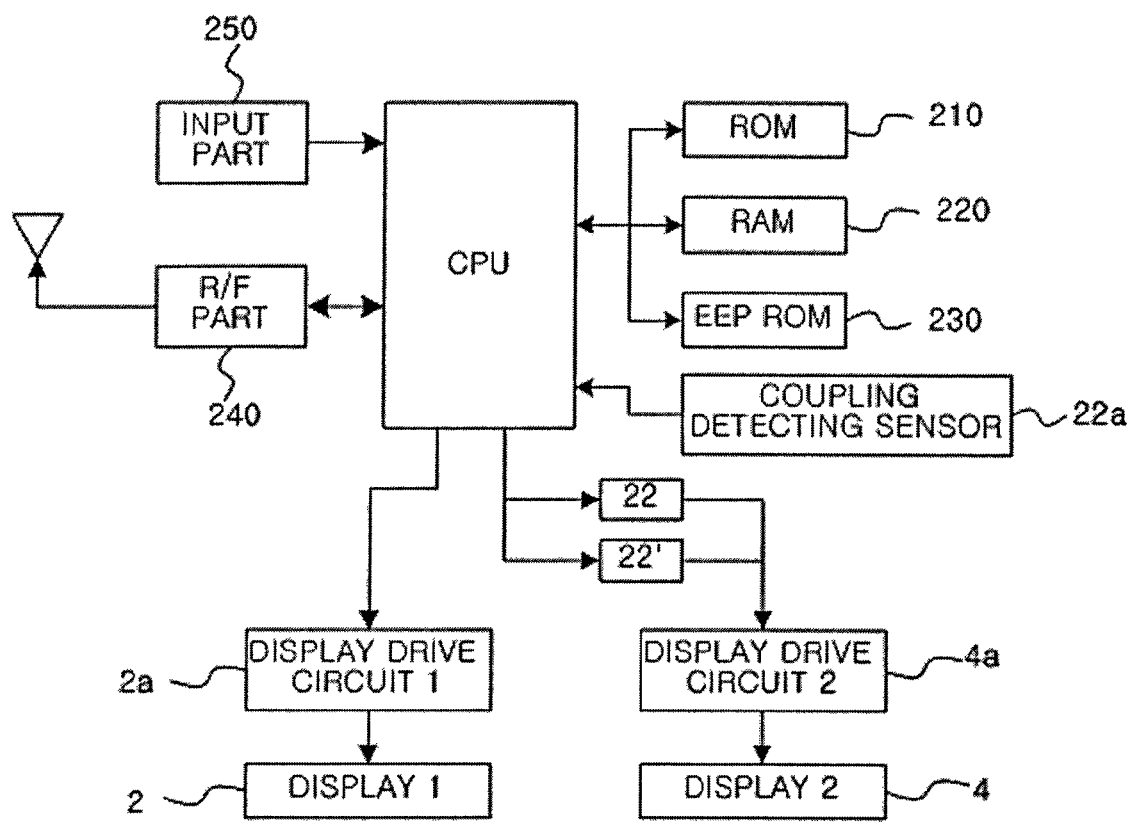
FIG. 24 is a block diagram illustrating a driving structure of a display device of the present invention.

FIG. 24 is a block diagram illustrating a display drive of the display device of the present invention in a state where the main body panel housing 20 and the sub-panel housing 40 are coupled.

In the multi-display device of the present invention, a storage device such as a memory is provided in the sub-panel housing 40 to enhance the function of the main body panel housing 20. At this point, the storage device disposed in the sub-panel housing 40 is coupled by a circuit to the CPU of the main body panel housing 20.

In the drawing, the CPU 200 is control means for controlling overall operation of the multi-display device of the present invention. A ROM 210 controls the display operating program, a RAM 220 stores the data generated when the program is operated, and a EEP ROM 230 stores the data which are required for the users, and which are needed for processing that data.

An R/F part 240 is a radio frequency to synchronize with an RF channel, amplify input sound signal, and convert the RF signal received from the antenna into a medium frequency signal. An input part 250 comprises numeric keys, menu keys, and selection keys. That is, the button keys 110 in FIG. 1, the input keys 110 in FIG. 26b, and a touch panel that may be disposed on the display are generally represented by the input part 250.

There are display drive circuits 2a and 4a for driving the displays by the output of the CPU 200, and are first and second displays 2 and 4 for displaying the information on a screen by an output signal of the display drive circuits (the display disposed on the main body panel housing 20 is a first display, and the display disposed on the sub-panel housing 40 is a second display). The second drive circuit 4a and the second display 4 are coupled to the CPU 200 by coupling means 22 and 22'.

A coupling detecting sensor 22a detects if the main body panel housing 20 is coupled to the sub-panel housing 40. When the panel housings are coupled, the coupling detecting sensor 22a detects the projection sensor 44a and transmits the detected signal to the CPU 200. That is, in a circularly opened state, when the coupling detecting sensor 22a contacts the projection sensor 44a, it is circularly closed so as to realize the electric flow. As the coupling detecting sensor 22a, a variety of sensors such as an optical sensor can be selected.

Figure 25:
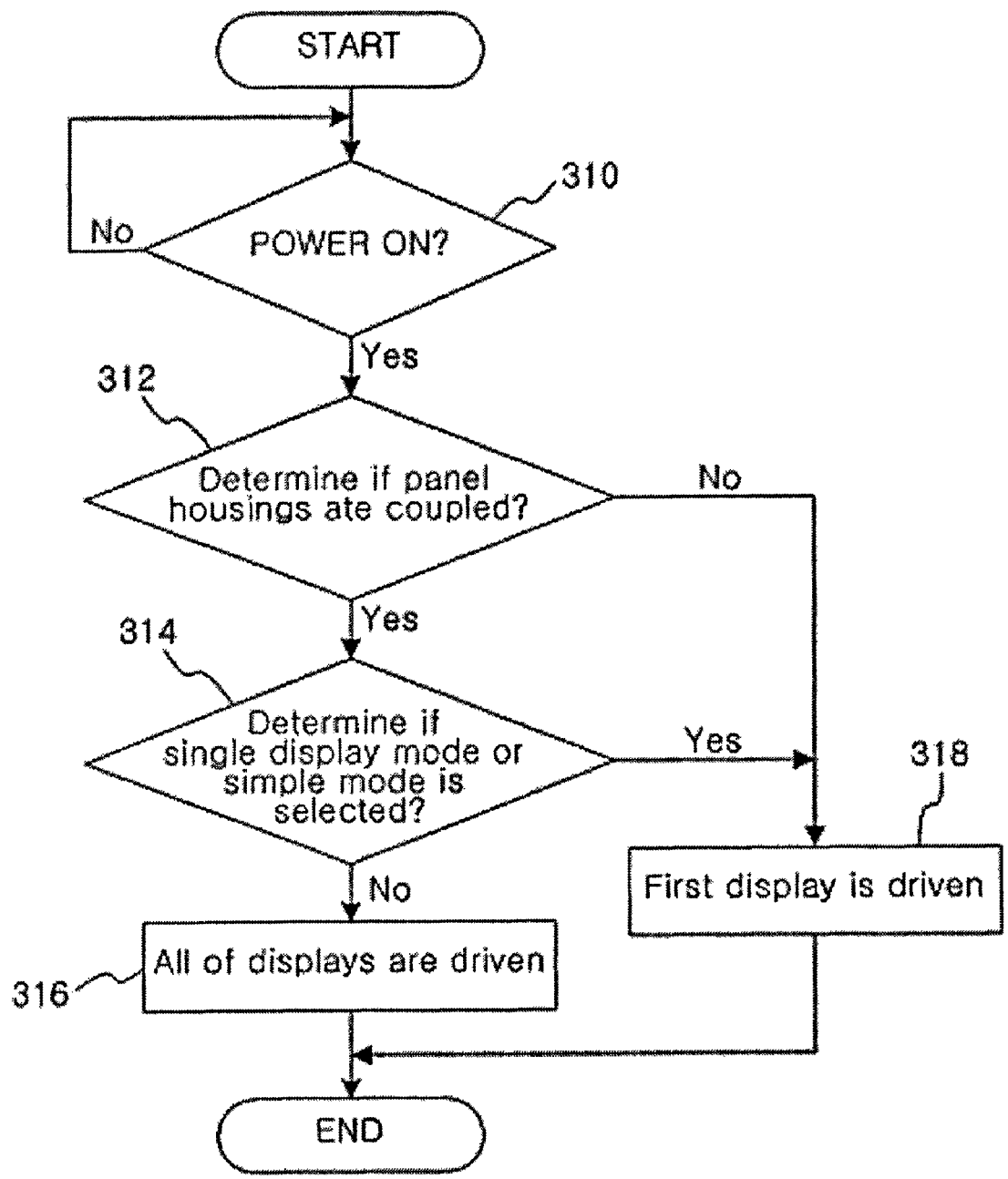
FIG. 25 is a flowchart illustrating a process for drive control of the display according to a preferred embodiment of the present invention.

FIG. 25 shows a flowchart illustrating a drive control method for the display according to a preferred embodiment of the present invention. This flowchart shows a control process for selectively driving the first and second displays 2 and 4 respectively provided on the main body panel housing 20 and the sub-panel housing 40 as the main body panel housing 20 is coupled to or separated from the sub-panel housing 40.

When a user turns the power switch on, the radio frequency signal received from the antenna is transmitted to the CPU 200 through the R/F part 240. In addition, when a specific function is set through the input part 250, the CPU 200 performs the specific function and outputs a signal for driving the displays 2 and 4 to the display drive circuits 2a and 4a. In addition, the coupling detecting sensor 22a detects if the main body panel housing 20 is coupled to the sub-panel housing 40 and transmits the corresponding signal to the CPU 200.

The flowchart depicted in FIG. 25 will be described hereinafter on the basis of the above-described circuit.

It is determined if the power switch is turned on (S310). When the power switch is turned on, the CPU 200 uses the coupling detecting sensor 22a to determine if the panel housings are coupled (S312). That is, it is determined if the main body panel housing 20 is coupled to the sub-panel housing 40.

When the panel housings are coupled to each other, it is determined if a single display mode or a simple mode is selected (S314). The selection of the single display mode or the simple mode is realized through the input part 250. That is, the single display mode or the simple mode enables for the user to select one of the first and second displays 2 and 4 when a simple function such as calculation function and pocket function is required. In addition, when a complex function such as Internet is performed, two displays are required.

When one of the single display mode and the simple mode is selected through the input part 250, the selection state is output from the input part 250 to the CPU 200. When both of the single display mode and the simple mode are not selected, all of the displays are driven (S316).

In addition, when the CPU 200 detects that the panel housings are not coupled to each other from the coupling detecting sensor 22a, only the first display is driven. When only one of the modes is selected, only the first display is driven (S318).

Here, the drive of the first display does not means that simply only one display is driven but means that a display mode is different from the case where two displays are all driven. For example, a display mode for a simple pocket function or a transmission of e-mail is different from a complex mode for Internet or a graphic. That is, a display mode or a design is different from that for driving two displays.

Although not illustrated in the block diagram, when the display is an LCD, since the power source for the backlight system can be selectively cut-off, the user can selectively supply the power for the backlight system.

Embodiment 5

Figure 26A:
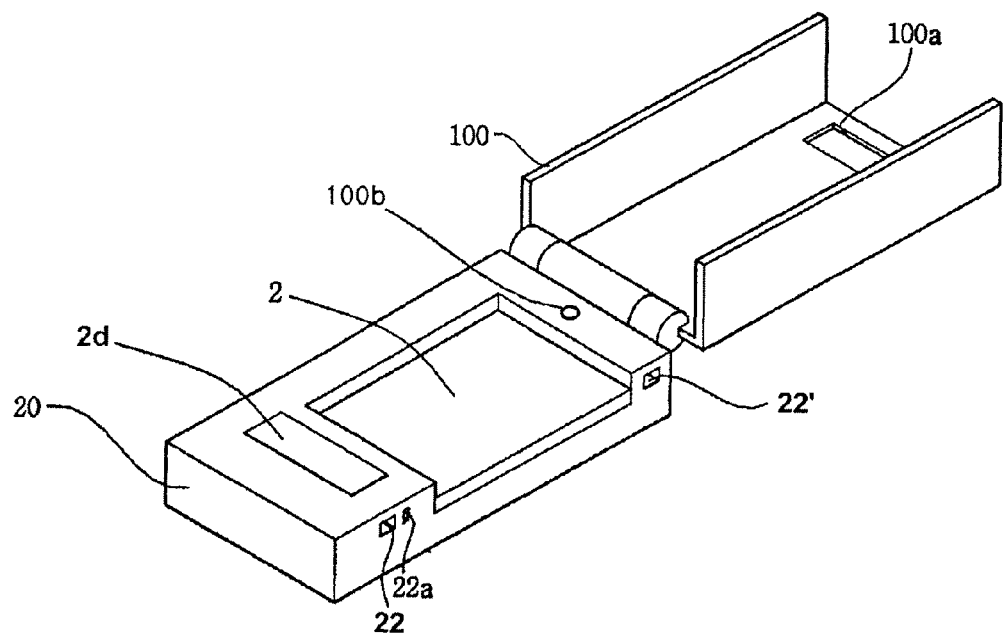
FIGS. 26a and 26b are views illustrating a potable multi-display device according to another embodiment of the present invention.
Figure 26B:
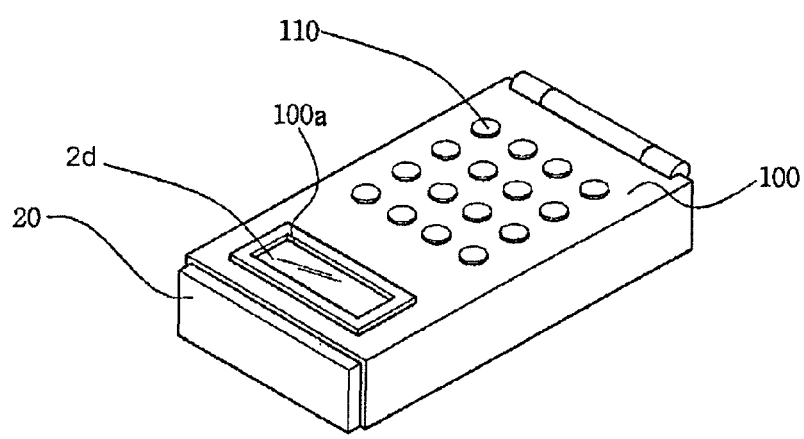

FIGS. 26a and 26b show another embodiment of the multi-display device of the present invention.

As shown in FIG. 26a, a sub-display 2d is provided in the main body panel housing 20. The sub-display 2d is viewed even when the cover 100 is folded. That is, the cover 100 is provided with a cover window 100a. In addition, the main body panel housing 20 is provided with a cover sensor 100b so as to detect if the cover 100 is folded or not.

FIG. 26b shows the folded cover 100. The input key 110 is formed on an outer surface of the cover 100 and even when the cover 100 is folded, the sub-display 2d is viewed through the cover window 100a.

Accordingly, when the cover 100 is folded, the CPU 200 detects through the cover sensor 100b that the cover 100 is folded to drive the sub-display 2d. This operation method is similar to that depicted in FIGS. 24 and 25.

In this embodiment, although only two panel housings are examplled for the convenience, the identical method can be applied even when more than tree panel housings are provided.

Embodiment 6

When the panel housings 20 and 40 are coupled only by the coupling means 22, 22', 44 and 44', the mechanical reliability deteriorates. Therefore, in this embodiment, fixing means 30 and 30' formed in a projection member is provided on the panel housing so as to enhance the mechanical coupling reliability.

Figure 27:
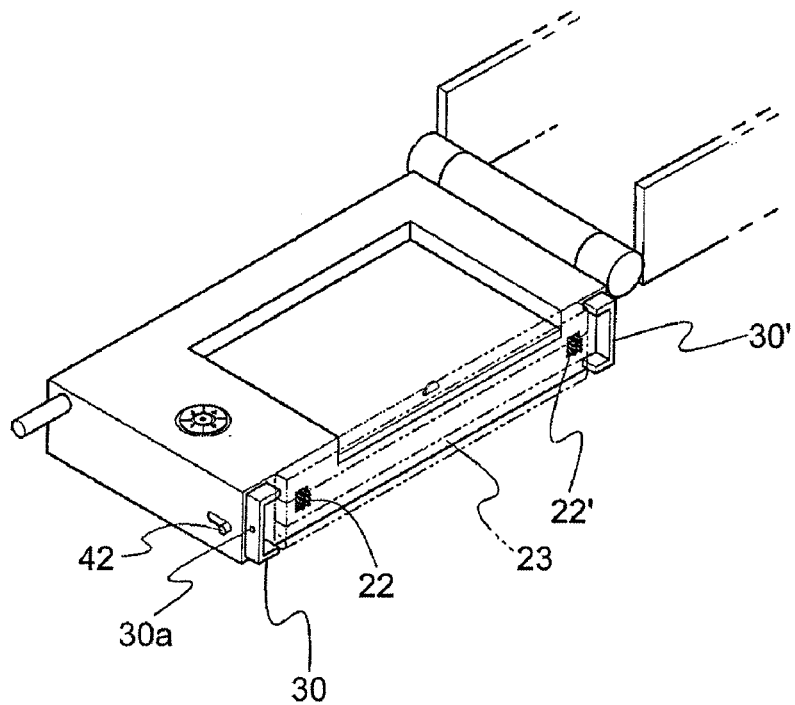
FIG. 27 is a view illustrating a main body panel housing provided with fixing means.

FIG. 27 shows a main body panel housing provided with fixing means.

The main body panel housing 20 is provided with fixing means 30 and 30' which are to be inserted into the sub-panel housing 40 to securely maintain the coupling state of the panel housings.

The fixing means 30 and 30' can be inserted into or projected out of the main ,body panel housing 20 by a lever 42. That is, the fixing means and the coupling means 22 are simultaneously operated by the single lever 42. The fixing means 30' and the coupling means 22' can be also inserted into or projected out of the main body panel housing 20 by a single lever 42' (disposed on an opposing side of the lever 42 and omitted in the drawing).

As shown in FIG. 27, the fixing means 30 and 30' are mounted in a projected wall type on a peripheral sidewall of the main body panel housing 20. In addition, the fixing means 30 and 30' are provided with a locking groove 30a so as to function as a locking device when the main body panel housing 20 is coupled to the sub-panel housing 40.

In addition, protecting means 23 (see a broken line in the drawing) is further provided. The protecting means 23 is provided inside the fixing means 30 and 30' as shown in FIG. 27. That is, the protecting means 23 is mounted on the panel housing 20 so as not to cover and interfere the fixing means 30 and 30'.

Figure 28A:
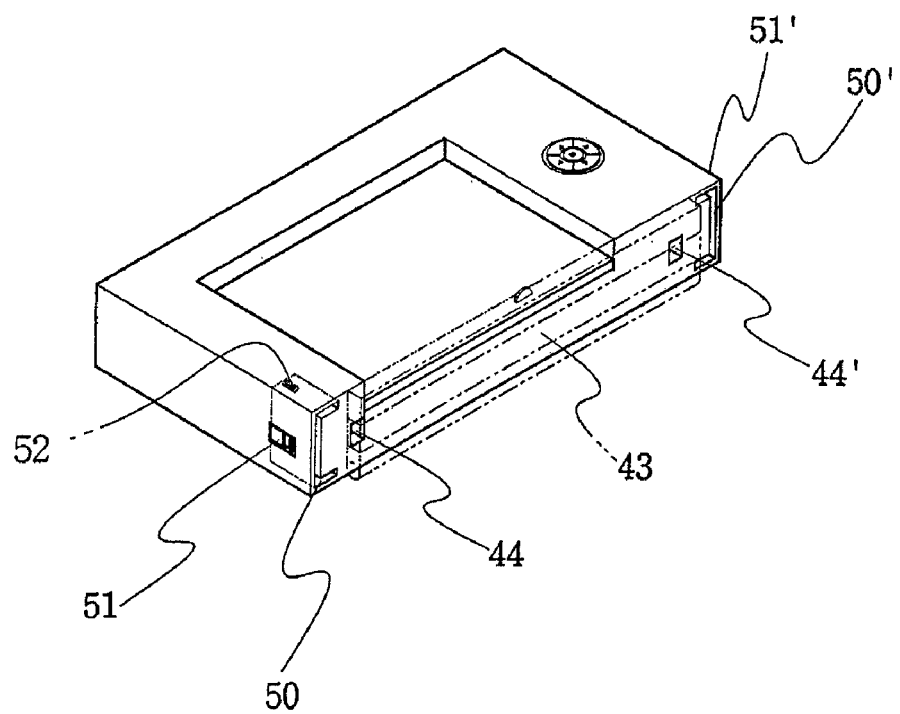
FIG. 28a is a view illustrating a sub-panel housing provided with fixing means.
Figure 28B:
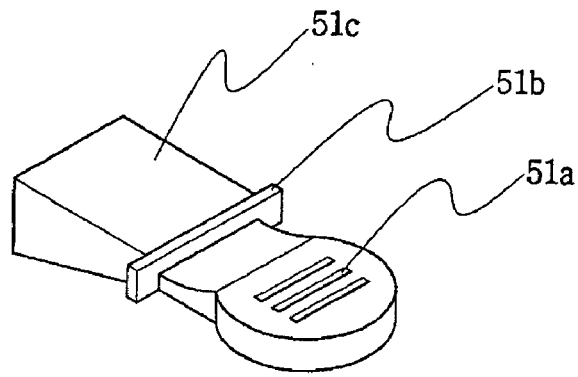

FIG. 28a shows a sub-panel housing provided with fixing means and FIG. 28b shows an enlarged view of a locking device of FIG. 28a.

As shown in FIG. 28a, the sub-panel housing 40 is provided with fixing grooves 50 and 50' in which the fixing means 30 and 30' of the main body panel housing 20 are inserted.

The sub-panel housing 40 is further provided with a locking device 51. As shown in FIG. 28b, the locking device 51 comprises a locking button 51a, a locking lever 51b and a locking projection 51c. The fixing groove 30a of the main body panel housing 20 is coupled to the locking projection 51c.

Accordingly, when the main body panel housing 20 and the sub-panel housing 40 are coupled to each other, the locking projection 51c is coupled to the locking groove 30a, thereby realizing a locking structure. In addition, when the locking button 51a is pushed, the locking projection 51c moves upward on the basis of the locking lever 51b. In addition, the locking device 51' having an identical function to the locking device 51 is also provided on an opposing side of the locking device 51. Therefore, to completely separate the main body panel housing 20 and the sub-panel housing 40 from each other, all of the buttons provided on the locking devices 51 and 51' should be all pushed.

At this point, the main body panel housing 20 is pushed away from the sub-panel housing 40 by elastic devices 52 and 52', thereby releasing the coupling state between the main body panel housing 20 and the sub-panel housing 40.

Likewise, protecting means for protecting the side portion of the display exposed through the panel housing 40 can be also provided (see broken line in the drawing).

Figure 29A:
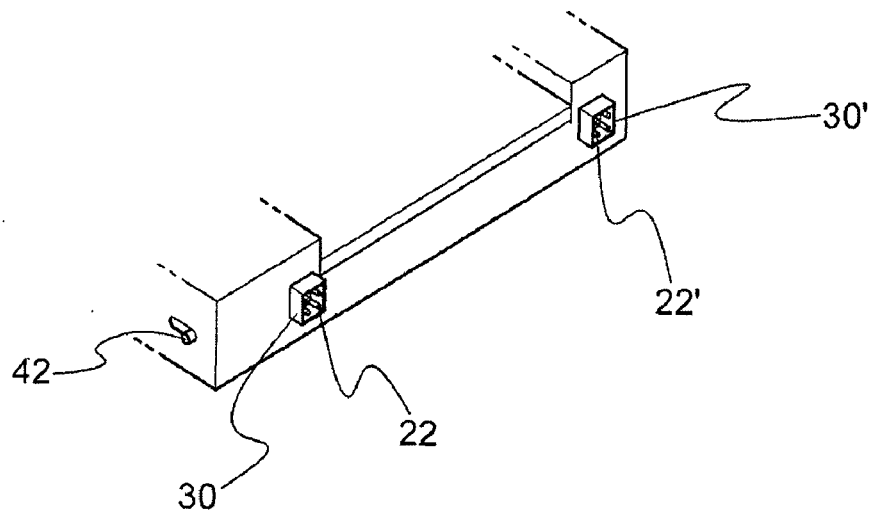
FIGS. 29a and 29b are views illustrating another example of fixing means.
Figure 29B:
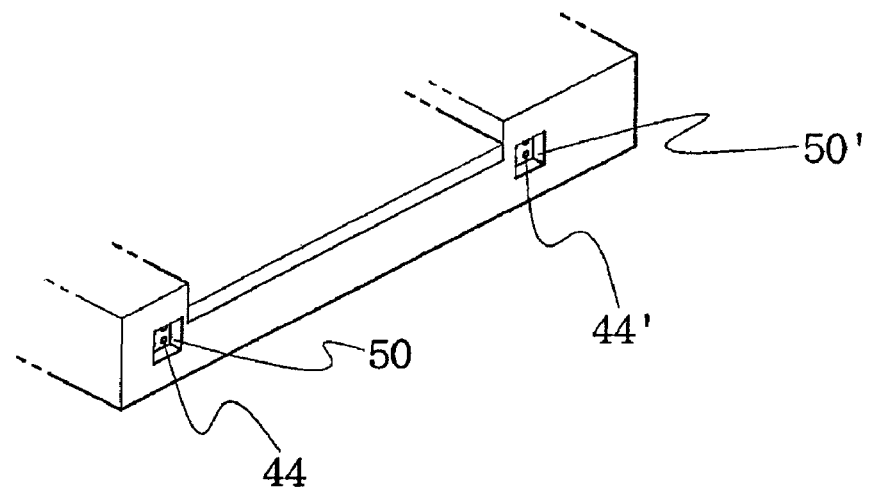

FIGS. 29a and 29b show another example of the fixing means.

As shown in FIG. 29a, a rectangular projection which is fixing means 30 and 30', is formed around the coupling means 22 and 22' formed in a pin-shape. As shown in FIG. 29b, the sub-panel housing 40 is provided at its side portion with groove type coupling means 44 and 44' and fixing grooves 50 and 50'.

Figure 30A:
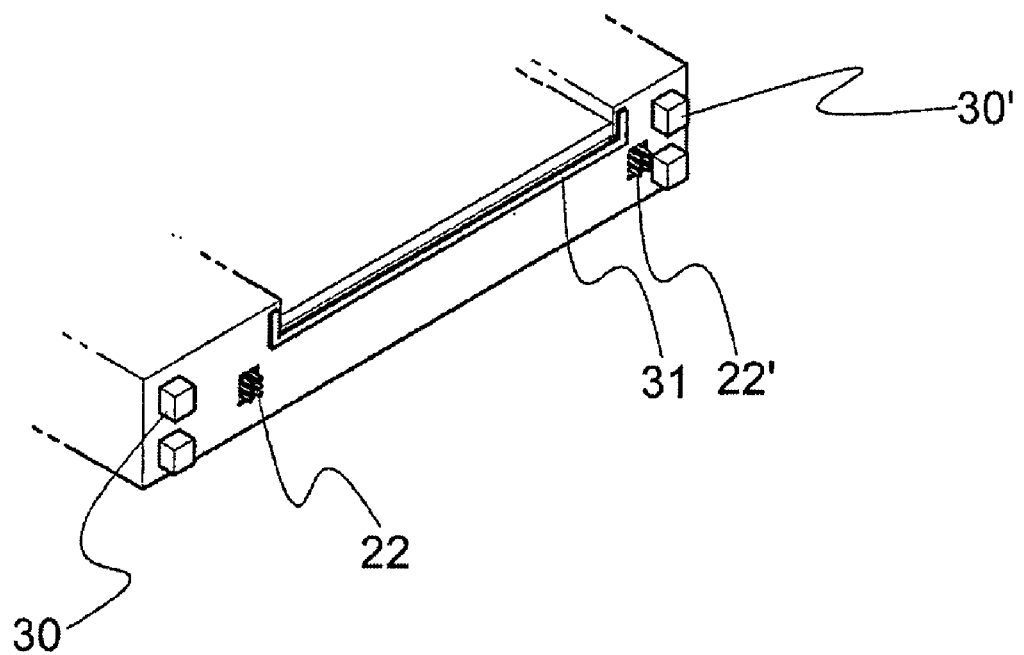
FIGS. 30a and 30b are views illustrating projection type fixing means.
Figure 30B:
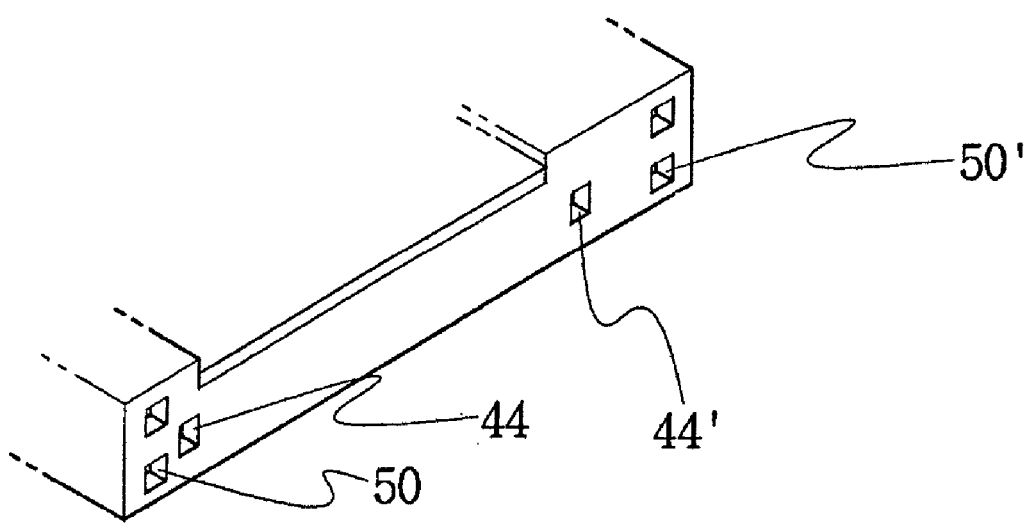

FIGS. 30a and 30b show the fixing means formed in a projection type, in which FIG. 30a shows a main body panel housing and FIG. 30b shows a sub-panel housing.

Four fixing means 30 and 30' are provided on the peripheral portion for providing the stability. Four fixing grooves 50 and 50' corresponding to the fixing means are also formed on a side peripheral portion of the sub-panel housing 40.

In addition, the main body panel housing 20 is provided at its coupling surface with shock absorbing means 31 for protecting the display when the panel housing is coupled and separated. That is, a longitudinal groove is formed on the side potion of the main body panel housing 20, and the shock absorbing means 31 such as a sponge is disposed in the longitudinal groove. The shock absorbing means 31 is elevated from the surface of the panel housing 20, but when outer force is applied thereto, it is reduced to a surface identical to the surface of the panel housing. Therefore, the shock absorbing means 31 is made of the sponge or rubber that is reduced in its volume when being applied with pressure. In addition, the shock absorbing means 31 can be provided all three exposed surfaces of the display.

Figure 31A:
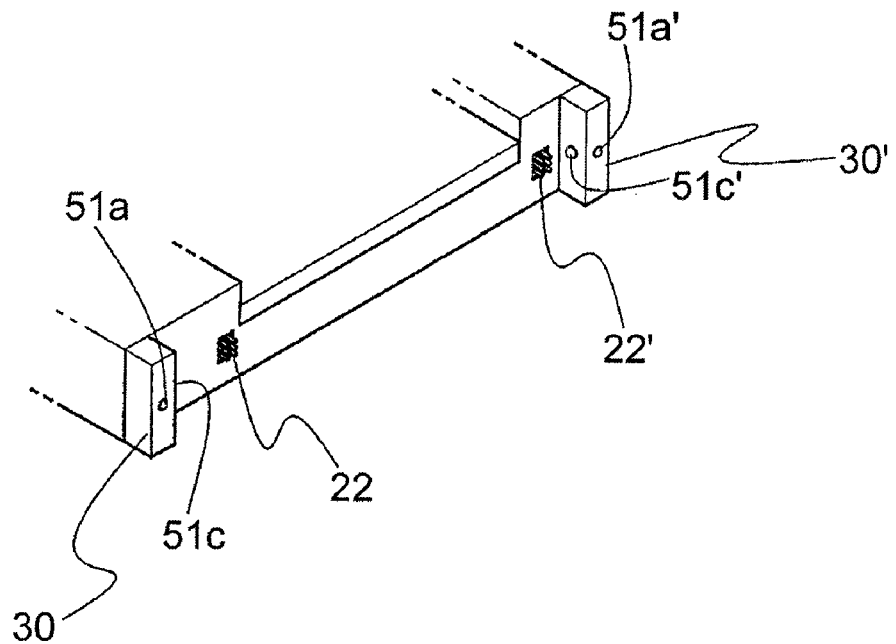
FIGS. 31a and 31b are views illustrating step type fixing means.
Figure 31B:
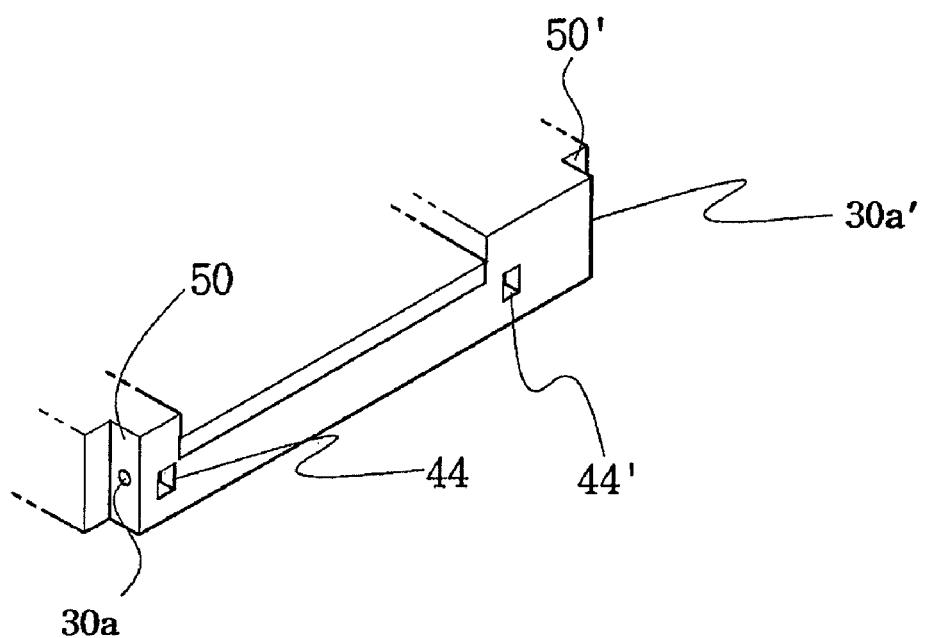

FIGS. 31a and 31b show another example of the fixing means, which is formed in a step type. FIG. 31 shows the main body panel housing and FIG. 31b shows the sub-panel housing.

In this example, the fixing means 30 and 30' that is formed in a step type is formed on a peripheral portion of the coupling surface of the panel housing. The step type fixing means 30 and 30' are correspondingly formed to each other such that they can be interlocked. As shown in FIG. 27, a locking device 51 may be further provided to the fixing means 30 and 30'. Fixing grooves 50 and 50' are formed on the sub-panel housing 40. Locking projections 51c and 51c' are coupled to locking grooves 30a and 30a'. The locking is released by locking buttons 51a and 51a'.

In this embodiment, although two panel housings are exampled for the descriptive convenience, more than three panel housings can be coupled in an identical manner.

Embodiment 7

Figure 32:
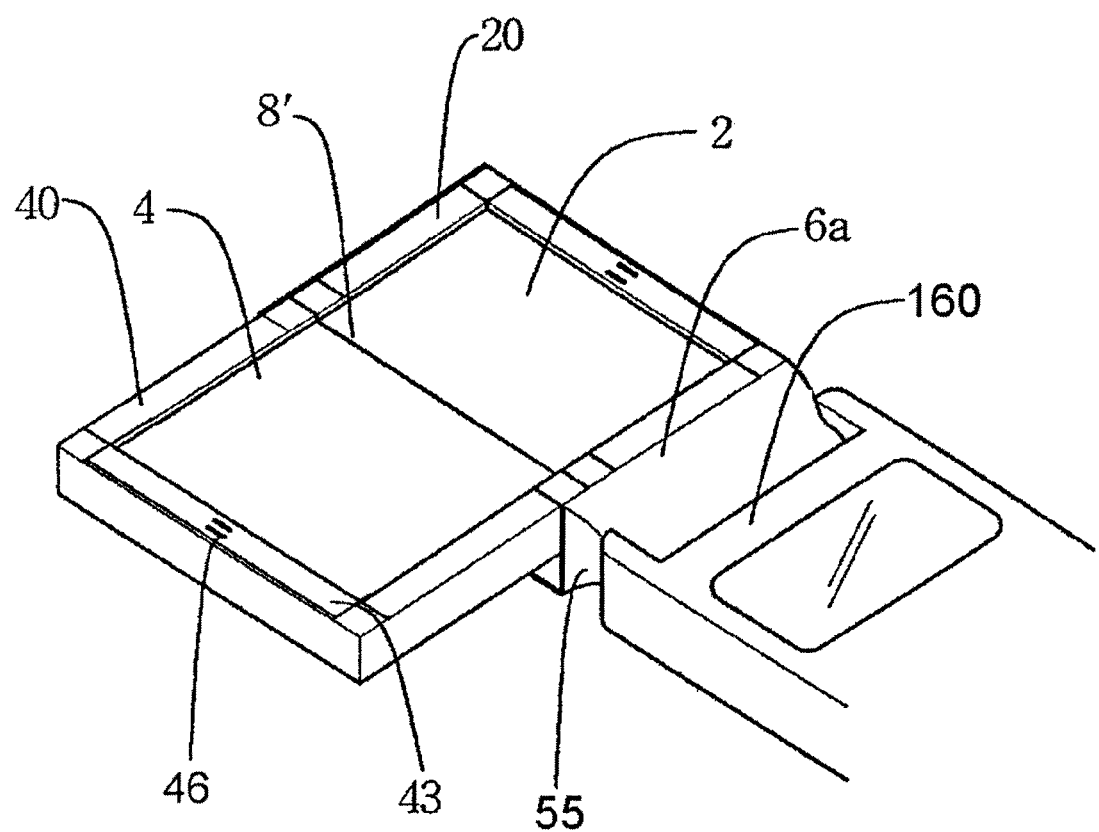
FIG. 32 is a view illustrating a portable multi-display device according to another embodiment of the present invention.

FIG. 32 shows another embodiment of the portable multi-display device of the present invention. At least two displays are stacked. When the displays slide from each other to enlarge the screen, a side portion of display joint portion where the displays are disposed adjacent each other is protected by a protecting cover.

As shown in the drawing, the upper panel housing 20 is provided with the upper display 2, and the lower panel housing 40 is provided with the lower display 4 and connected to a main body 160 by a housing 55 and a connecting portion 6a. The main body 160 is provided with the menu keys and the button keys.

Figure 33A:
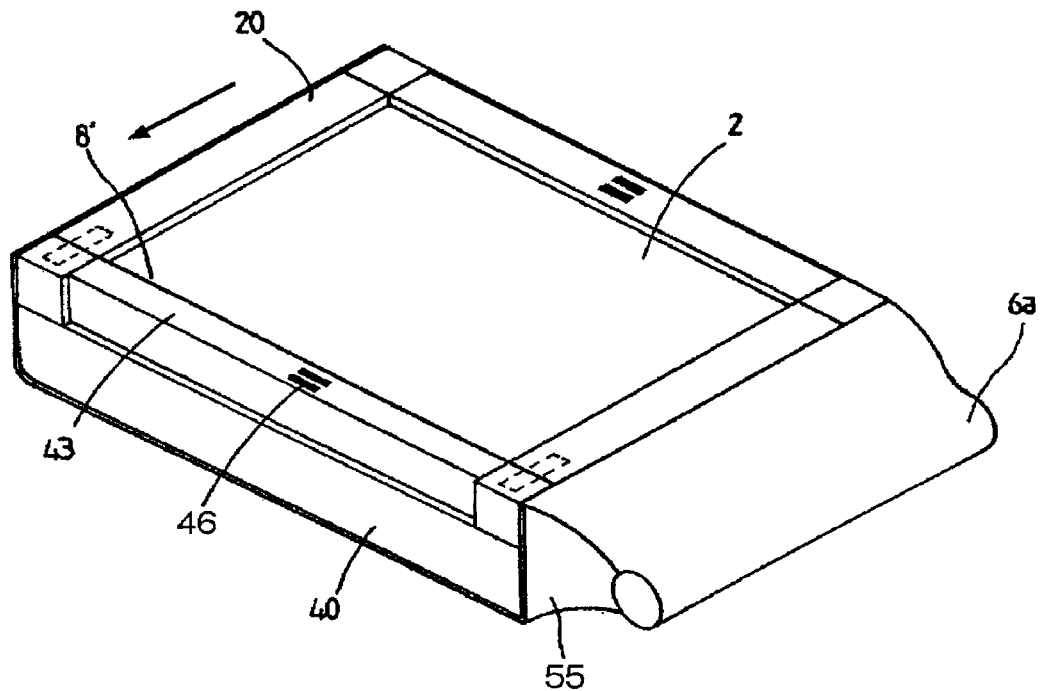
FIGS. 33a to 34 are views illustrating the enlargement of a screen as displays slide.
Figure 33B:
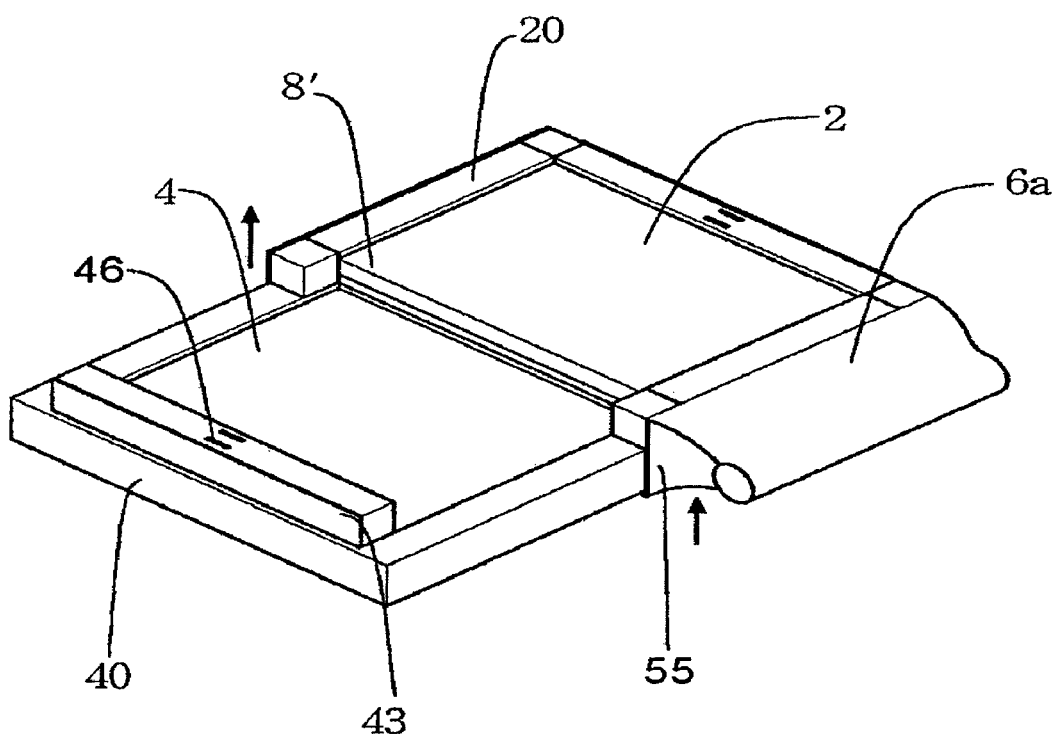

FIGS. 33a and 33b show the displays that slide from each other to enlarge the screen.

As shown in FIG. 33a, the upper panel housing 20 having the upper display 2 is stacked on the lower panel hosing 40 having the lower display 4. The housing 55 fixes the upper and panel housings 20 and 40.

Using a grip 46 shown in FIG. 33a, when the user slides the lower panel housing 40 in the arrow direction, as shown in FIG. 33b, the lower display is spread to enlarge the screen. At this point, the protecting cover 43 is connected to the lower panel housing 40 such that it can move together with the lower panel housing 40.

Figure 34:
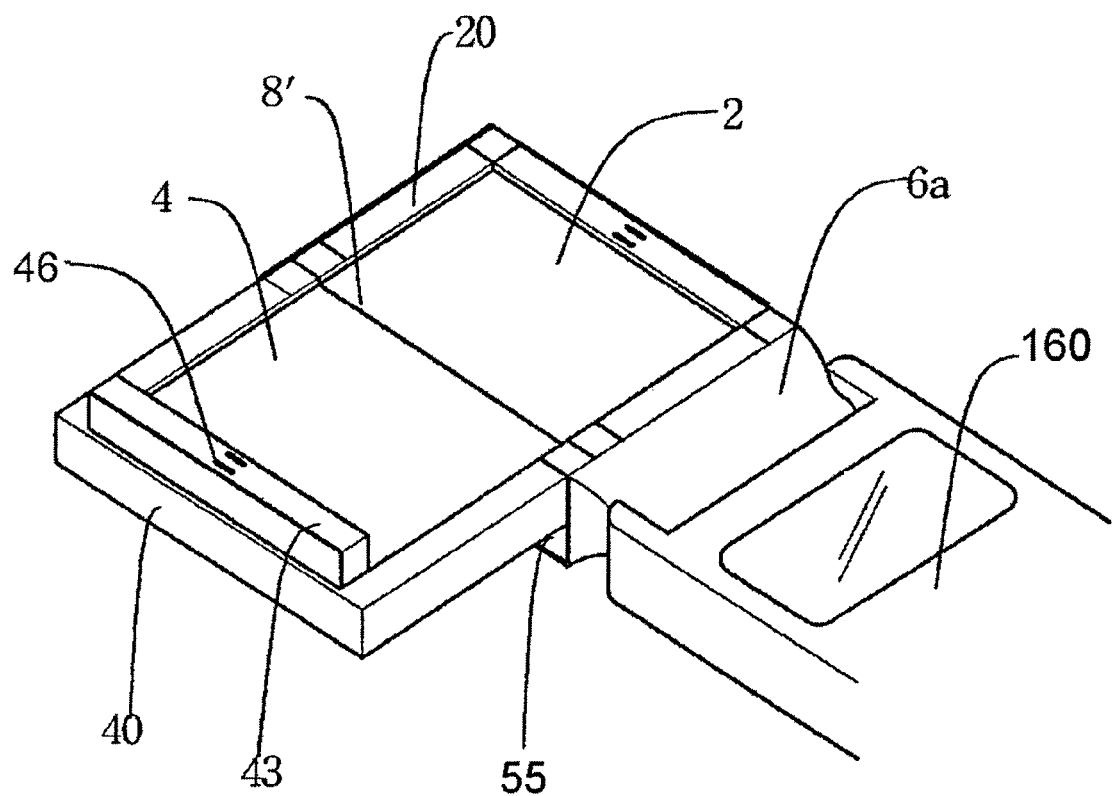

In addition, when the user slides up the lower panel housing 40 in the arrow direction, as shown in FIG. 34, the lower and upper displays 4 and 2 are disposed adjacent each other so as to provide a single screen effect.

At this point, when the protecting cover 43 is pushed, it is received in the lower panel housing 40. That is, when the upper and lower displays 2 and 4 are spread, it can be possible to receive the protecting cover 43 in the lower panel housing 40 as shown in FIG. 32.

Figure 35A:
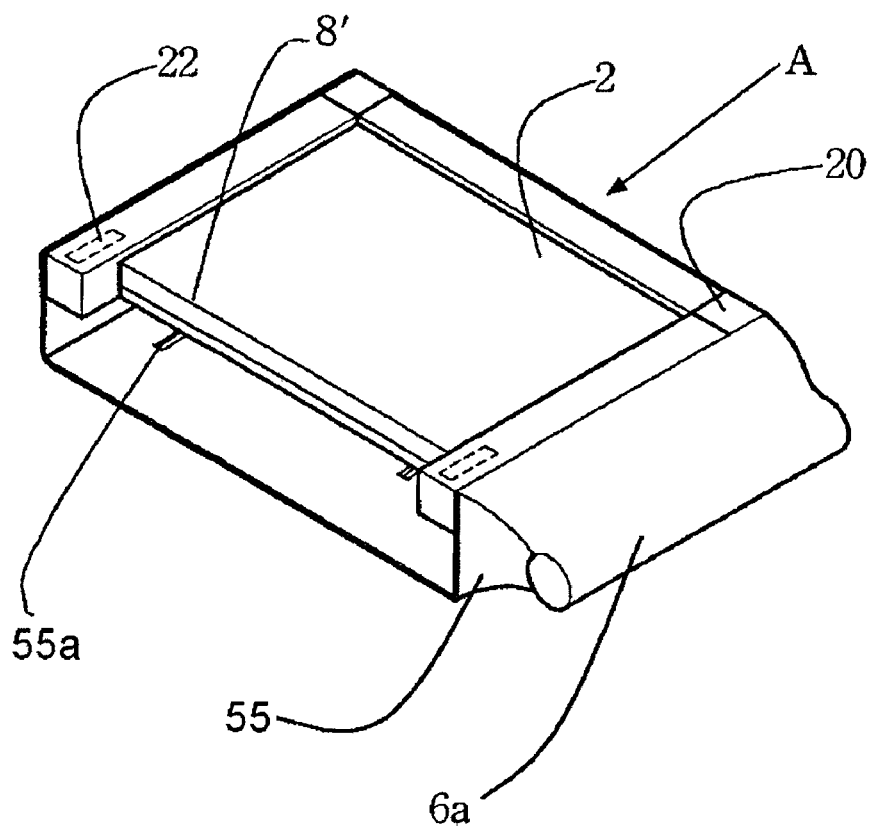
FIGS. 35a and 35b are views illustrating an upper panel housing and a lower panel housing.
Figure 35B:
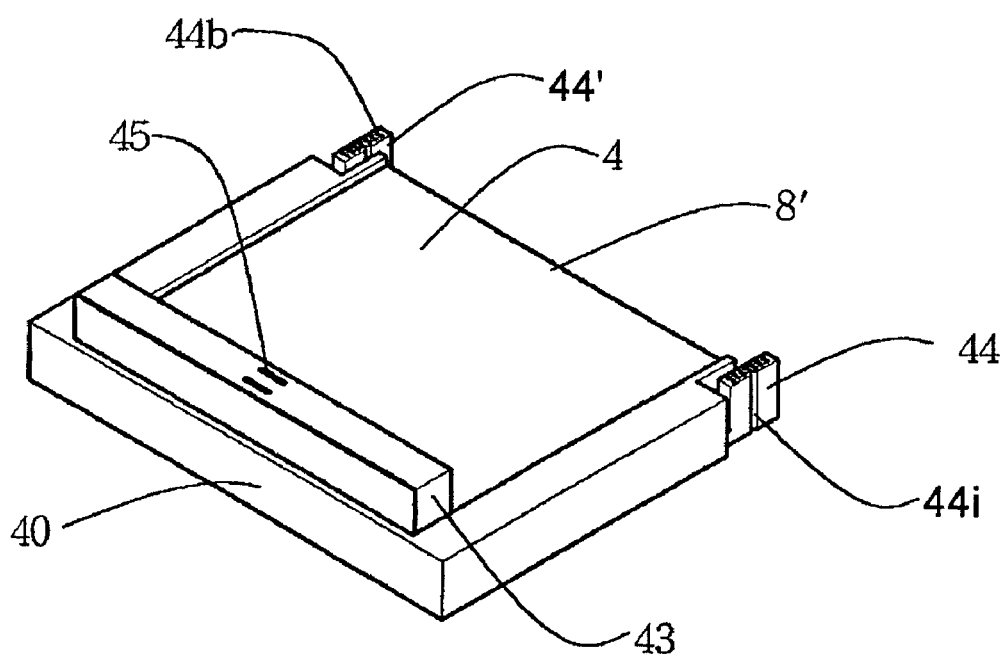

FIGS. 35a and 35b show the upper and lower panel housings.

The housing 55 is provided at its inner side with a sliding groove 55a along which the lower panel housing 40 slides horizontally. Although omitted in the drawing, formed on the lower panel housing 40 is a sling projection moving along the sliding groove 55a.

In addition, the lower panel housing 40 slides vertically so as to be finally coupled to the upper panel housing 20. At this point, the coupling means 44 provided on the lower panel housing 20 is coupled to the coupling means 22 (shown in a broken line in the drawing) provided on the upper panel housing 20.

In addition, the coupling means 44 of the lower panel housing 40 is provided with a coupling slide groove 44i enabling the lower panel housing 40 to slide vertically with respect to the upper panel housing 20. The coupling means 22 of the upper panel housing 20 is also provided with a slide projection moving along the coupling slide groove 44i.

In addition, when the upper display 2 is stacked on the lower display 2, the protecting cover 43 covers a side portion of the joint portion 8' of the displays. When the upper displays 2 is disposed adjacent to the lower display 4 on a same plan, the protecting cover 43 does not cover the joint portion 8'.

That is, When the upper and lower displays 2 and 4 slide in a state they are stacked, the protecting cover 43 is also moved not to cover the joint portion 8'.

In addition, since a portion A of the housing 55 (see FIG. 35a) is blocked, the joint portion 8' of the lower display 4 can be also covered when the upper and lower panel housings are stacked.

When the coupling means 44 is coupled, the upper and lower panel housings 20 and 40 are interconnected by a circuit by a connecting pin 44b. That is, the connecting pin 44b functions a circuit connector. Accordingly, the upper panel housing 20 is also provided with a circuit connecting means corresponding to the connecting pin 44b.

Accordingly, when the upper and lower panel housings 20 and 40 are stacked, they are not interconnected by a circuit, but when being spread to be adjacent each other, they are interconnected by the circuit by the circuit connecting means.

As shown in FIG. 33a, when the protecting cover 43 covers the side portion of the joint portion 8', it is designed having a symmetry structure to the opposite side to obtain the fine view effect.

Figure 36A:
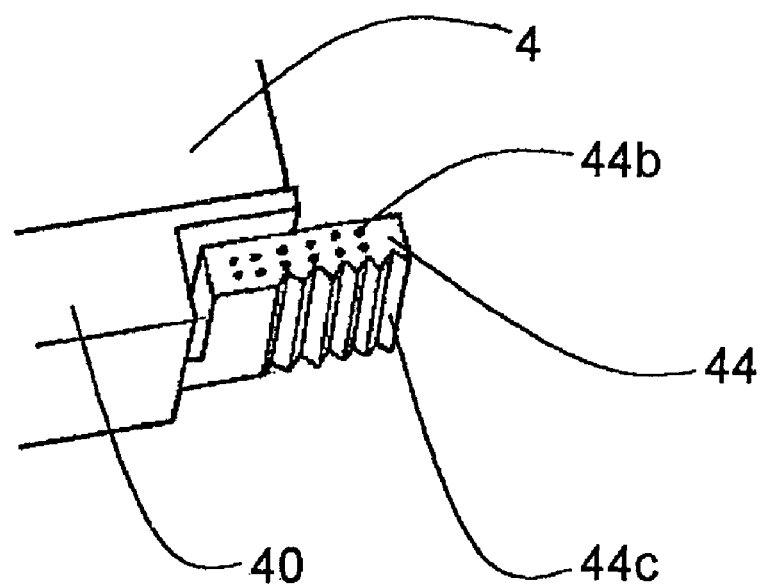
FIGS. 36a and 36b are views illustrating another example of sliding means.
Figure 36B:
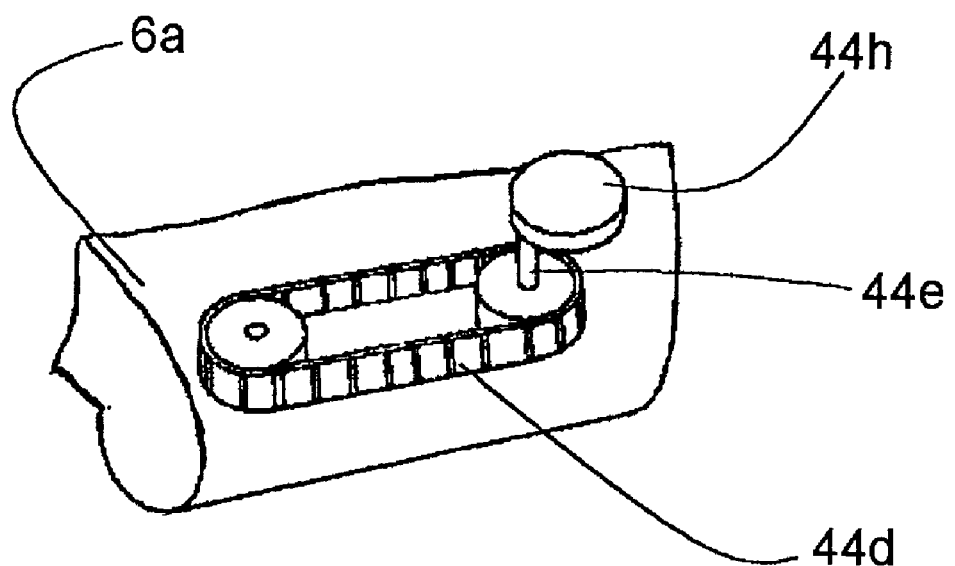

FIGS. 36a and 36b show another example of the sliding means.

As shown in FIG. 36a, the coupling means 44 is provided with a coupling gear 44c. As shown in FIG. 36b, an electric motor 44h, a motor shaft 44e and a coupling belt 44d are provided in the connecting portion 6a. The coupling bent 44d is engaged with the coupling gear 44c so as to provide the sliding movement to the lower panel housing 40 in a horizontal direction by the operation of the motor 44h.

That is, in a state where the upper and lower panel housings 20 and 40 are stacked as shown in FIG. 33a, the panel housings slide from each other by the power of the motor 44h, thereby the panel housings are spread in the stepped structure as shown in FIG. 33b.

Embodiment 8

FIGS. 37 to 39b show another embodiment of the portable multi-display device of the present invention.

Figure 37:
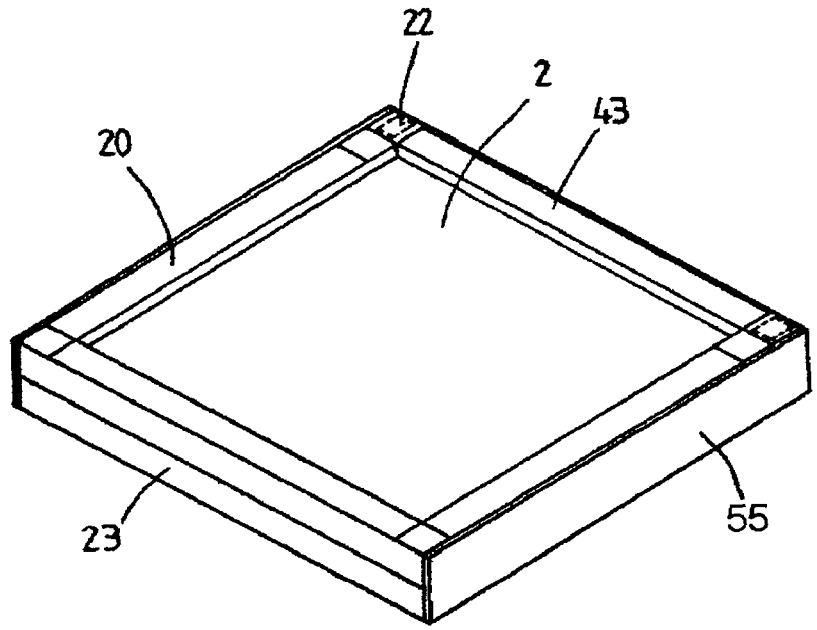
FIGS. 37 to 39b are views illustrating a portable multi-display device according to another embodiment of the present invention.
Figure 38:
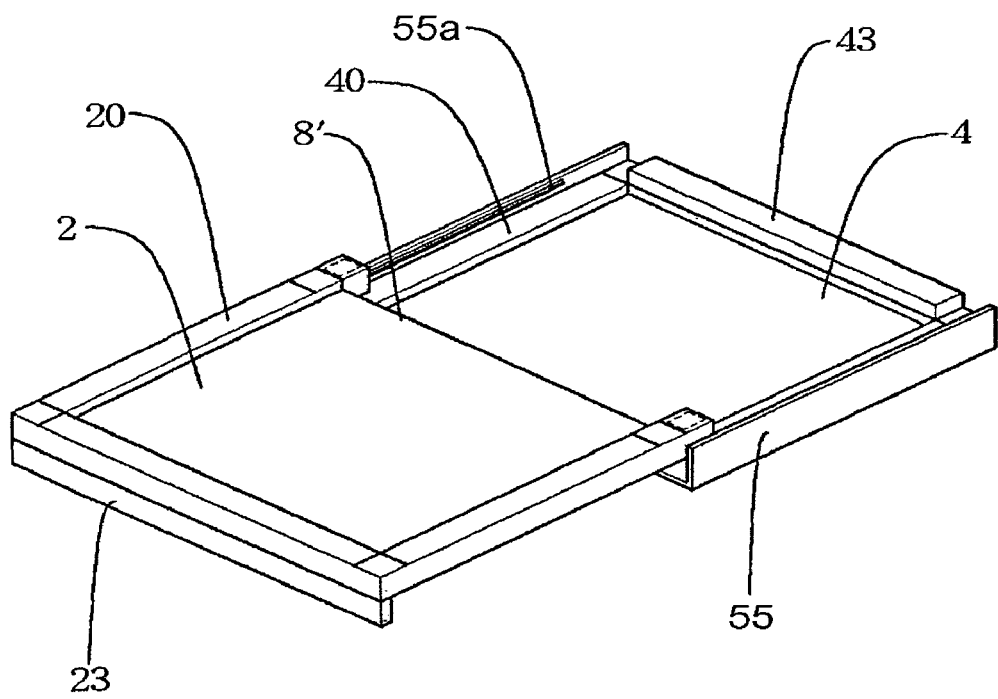

FIG. 37 shows that the upper panel housing 20 is stacked on the lower panel housing 40. At this point, when the upper panel housing 20 slides horizontally, the upper and lower panel housings 20 and 40 are spread in a stepped structure as shown in FIG. 38. The horizontal sliding movement is realized along a sliding groove 55a formed on the housing 55 on which the lower panel housing 40 is mounted.

Figure 39A:
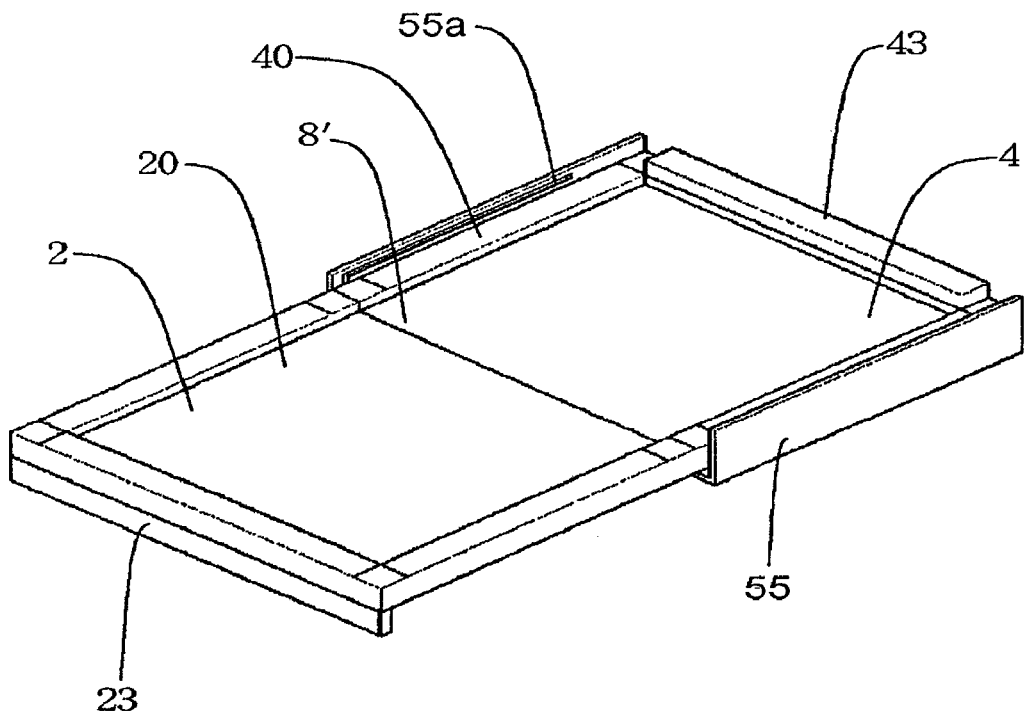

In a state where the upper and lower panel housings 20 and 40 are spread in the stepped structure, when the upper panel housing 20 slides in the vertical direction, the upper and lower displays 2 and 4 are disposed adjacent each other as shown in FIG. 39a, thereby providing an enlarged single screen.

At this point, the protecting cover 43 mounted on the lower panel housing 40 covers the side portion of the joint portion 8' of the upper display 2 when the lower and upper panel housings 40 and 20 are stacked. In addition, the protecting cover 23 provided on the upper panel housing 20 covers the side portion of the joint portion 8' of the lower display 4. The protecting cover does not cover the side portion of the joint portion when the displays are spread. The protecting cover 23 may be designed to cover the coupling means 44.

Figure 39B:
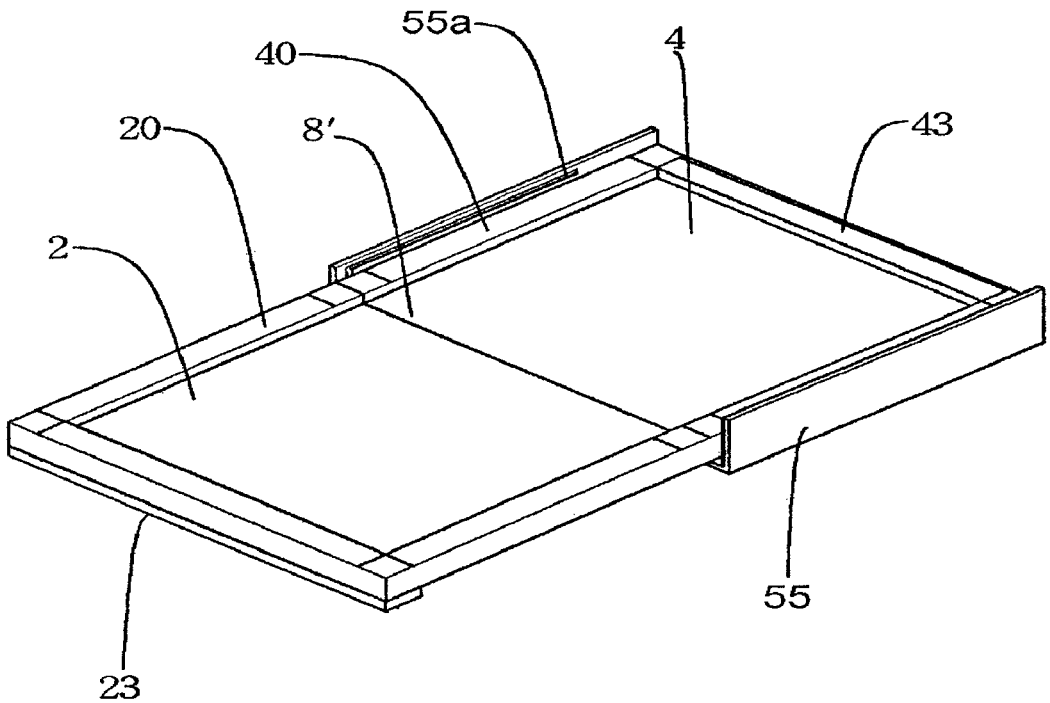

As shown in FIG. 39b, the protecting cover 23 provided on the upper panel housing 20 is located in a state where it is folded, and the protecting cover 43 provided on the lower panel housing 40 is received in the lower panel housing.

Embodiment 9

Figure 40A:
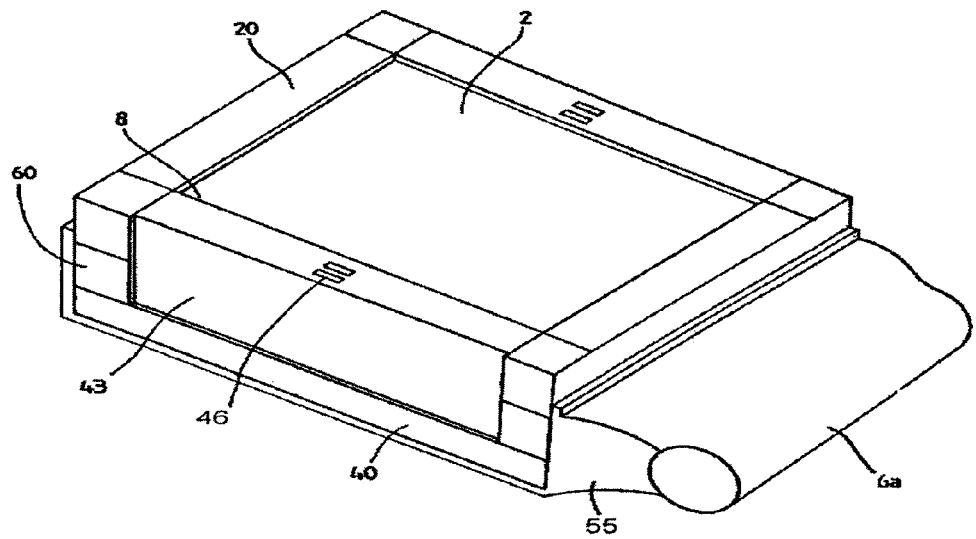
FIGS. 40a and 40b are views illustrating an example of more than 3 displays stacked one another.
Figure 40B:
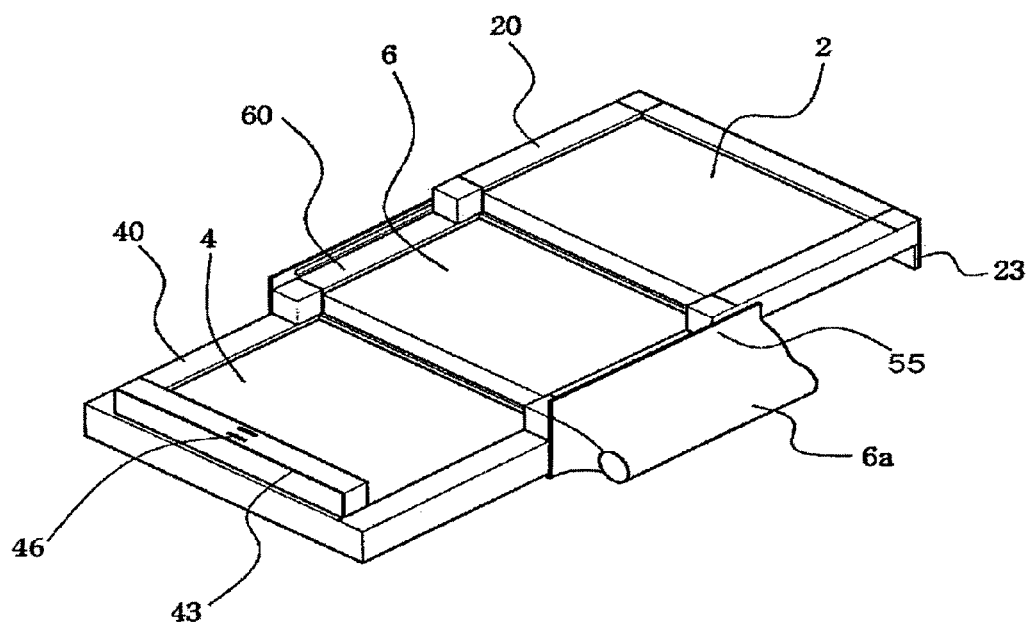

FIGS. 40a and 40b show another embodiment of the portable multi-display device of the present invention, in which more than three displays are stacked one another.

As shown in FIG. 40a, stacked between the upper and lower panel housing 20 and 40 is an intermediate panel housing 60.

In addition, when the upper panel housing 20 is designed to horizontally slide rightward in the drawing and the lower panel housing 40 is horizontally designed to slide leftward in the drawing, three displays 2, 4 and 6 are spread on the basis of the intermediate display 6 provided on the intermediate panel housing 60. That is, as shown in FIG. 40, the displays 2, 4 and 6 are spread in a stepped structure.

At this point, the protecting cover 43 of the lower panel housing 40 covers the left joint portion 8' of the intermediate display and the joint portion 8' of the upper display 2. In addition, the protecting cover 23 of the upper panel housing 20 covers the right joint portion 8' of the intermediate display 6. In addition, the joint portion 8' of the upper display 2 is covered by the housing 55.

When the upper display 2 slides down to the intermediate display 6 and the lower display 4 slides up to the intermediate display 6, the upper and lower displays 2 and 4 and the intermediate display 6 get to be adjacent each other, realizing the enlarged single screen.

Embodiment 10

An input device or an I.C. can be separately coupled to the main body 160 in an identical method to that for coupling the displays 2 and 4.

Figure 41:
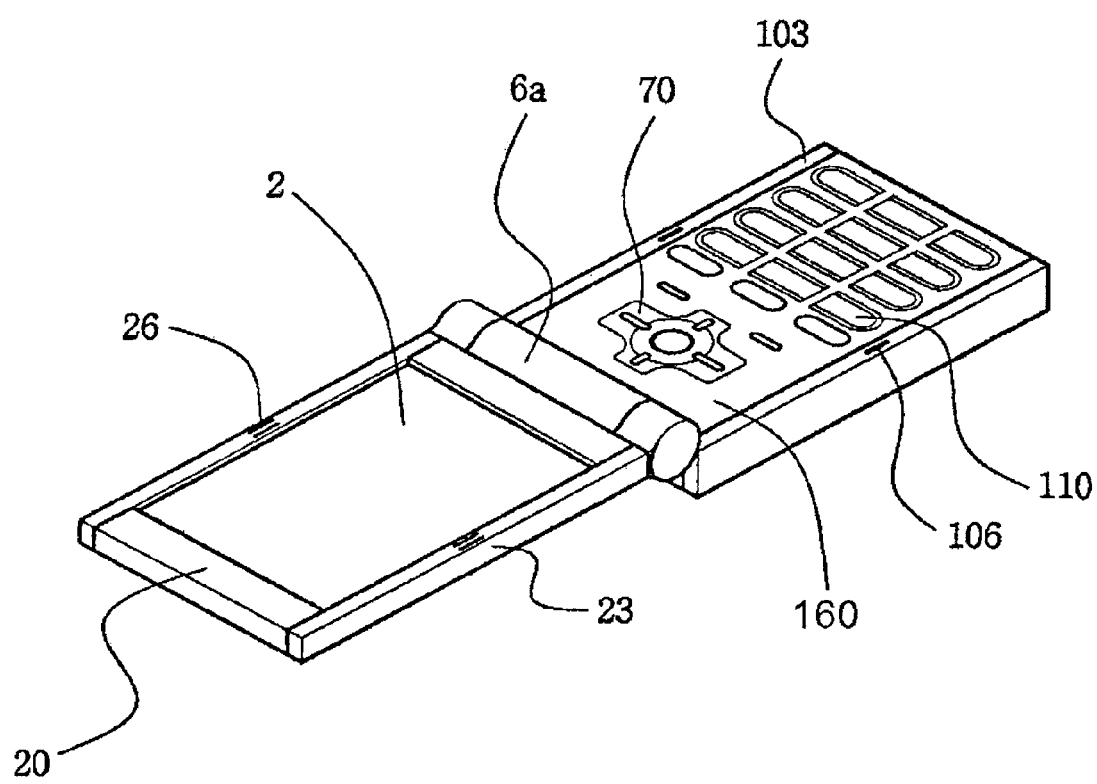
FIG. 41 is a view illustrating a state before other expanded devices are coupled to a main body panel housing.

FIG. 41 shows the main body panel housing and the main body before other expanding devices are coupled thereto.

The main body panel housing 20 is connected to the main body 160 by the connecting portion 6a and is provided with the protecting cover 23 and the grip 26. The main body 160 is provided with the input keys 110 and the button keys 70. The main body 160 is further provided at its side portion with a side cover 103 and a grip 106. In addition, the protecting cover 23 and the side cover 103 may be formed on both sides of the main body 160.

Figure 42A:
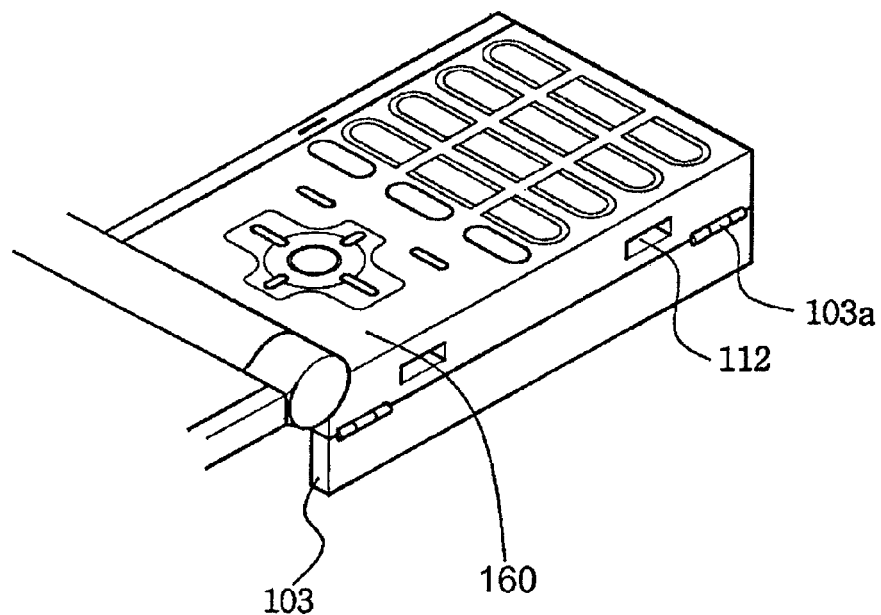
FIGS. 42a and 42b are views illustrating a state where a protecting cover and a side cover are unfolded.
Figure 42B:
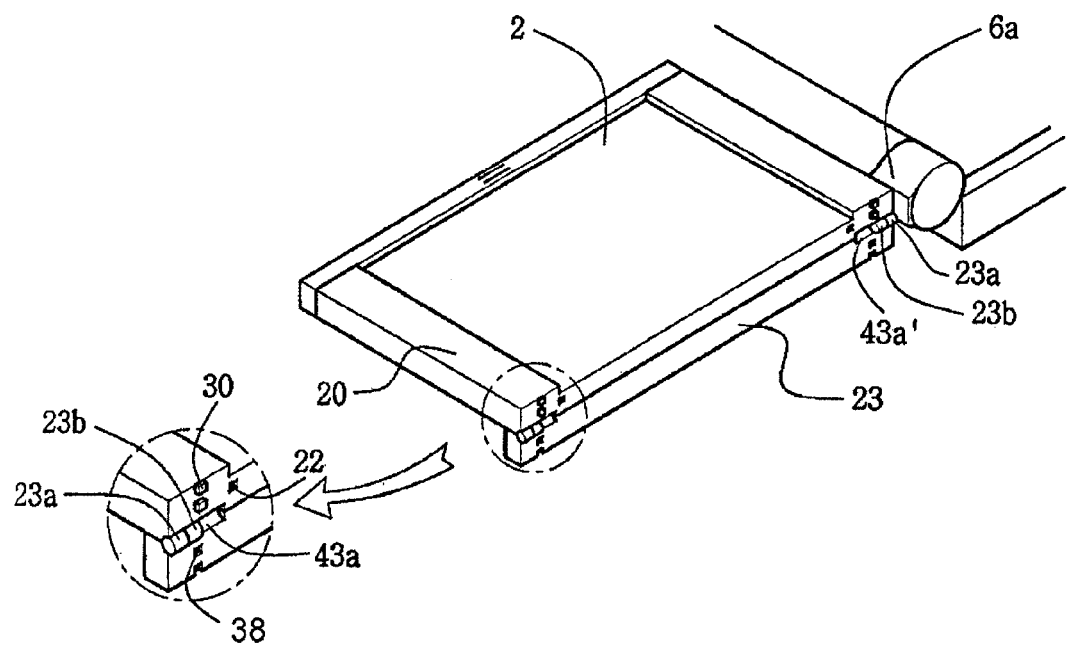

FIGS. 42a and 42b show a state where the protecting cover and the side cover are opened.

As shown in FIG. 42a, the side cover 103 provided in the main body 16o is designed to be closed and opened by a main body shaft 103a. When the side cover 103 is opened, the main body connecting portion 112 is exposed.

The protecting cover 23 of the main body panel housing can be opened as shown in FIG. 42b. When the protecting 23 is opened, the protecting cover 23 is spread inline, thereby exposing the fixing means 30 and the coupling means 22. At this point, a part of the protecting cover 23 is cut away so that the fixing means 30 can be provided.

That is, when the protecting cover 23 is closed, the fixing means 30 is located in the fixing means groove 38 and the cover shaft 23a and the panel housing shaft 23b are projected. At this point, since a shaft groove 43a' is provided on the main body panel housing 20, when the main body panel housing 20 and the sub-panel housing 40 are coupled to each other, the cover shaft 43a and the panel housing shaft 43b are located in the shaft groove 43a'. Likewise, the sub-panel housing 40 is also provided with a shaft groove in which the cover shaft 23a and the panel housing shaft 23b of the main body panel housing 20 are inserted.

Figure 43:
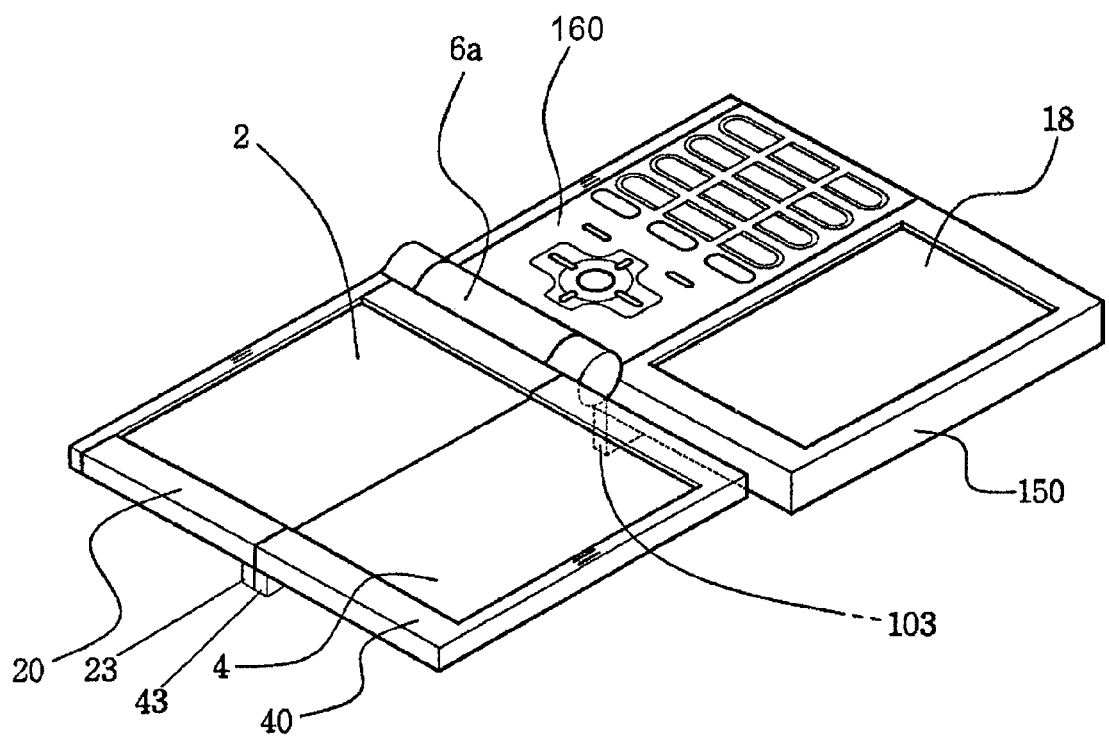
FIG. 43 is a view illustrating a state where expanding devices are coupled to a main body and a main body panel housing.

FIG. 43 shows the main body and the main body panel housing to which expanding devices care coupled.

Two displays 2 and 4 are coupled to be adjacent each other. The input device 18 is coupled to the main body 160. The input device 18 can be a digitizer or a touch panel. At this point, another sub-display may be mounted on a lower end of the input device 18.

The input device 18 is coupled through the main body connecting portion 112. The extended portion 150 is also provided with a connecting portion (not shown) connectable to the main body connecting portion 112.

In addition, the extended portion 150 provided with the input device 18 can be further provided with a memory device. Accordingly, when the extended portion 150 is coupled, the function of the main body 160 is improved.

In addition, displays can be further expanded by the protecting cover 23 disposed on both sides of the main body panel housing 20. Likewise, an extended portion 150 may be further mounted through the side cover 103 provided on both sides of the main body 160.

Figure 44:
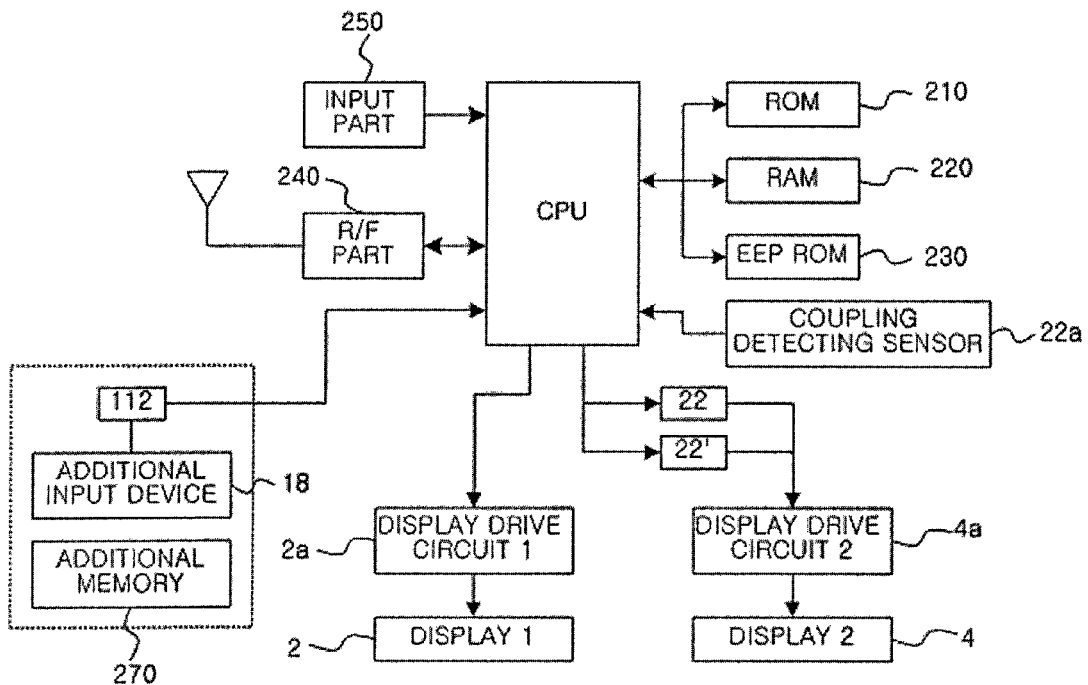
FIG. 44 is a block diagram illustrating a state where the expanding devices are coupled.

FIG. 44 shows a block diagram with the extended device. An additional memory 270 and an additional input device 18 are connected to the CPU 200 by the main body connecting portion 112.

Figure 45A:
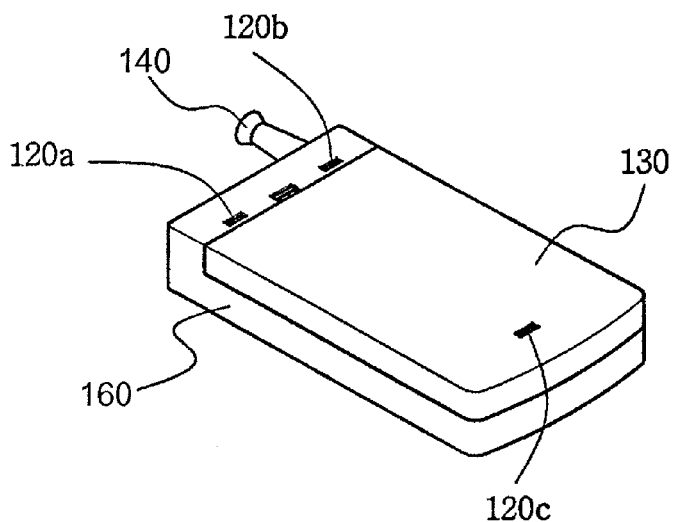
FIGS. 45a and 45b are views illustrating an example of an expanding device connected to a rear surface of a main body.
Figure 45B:
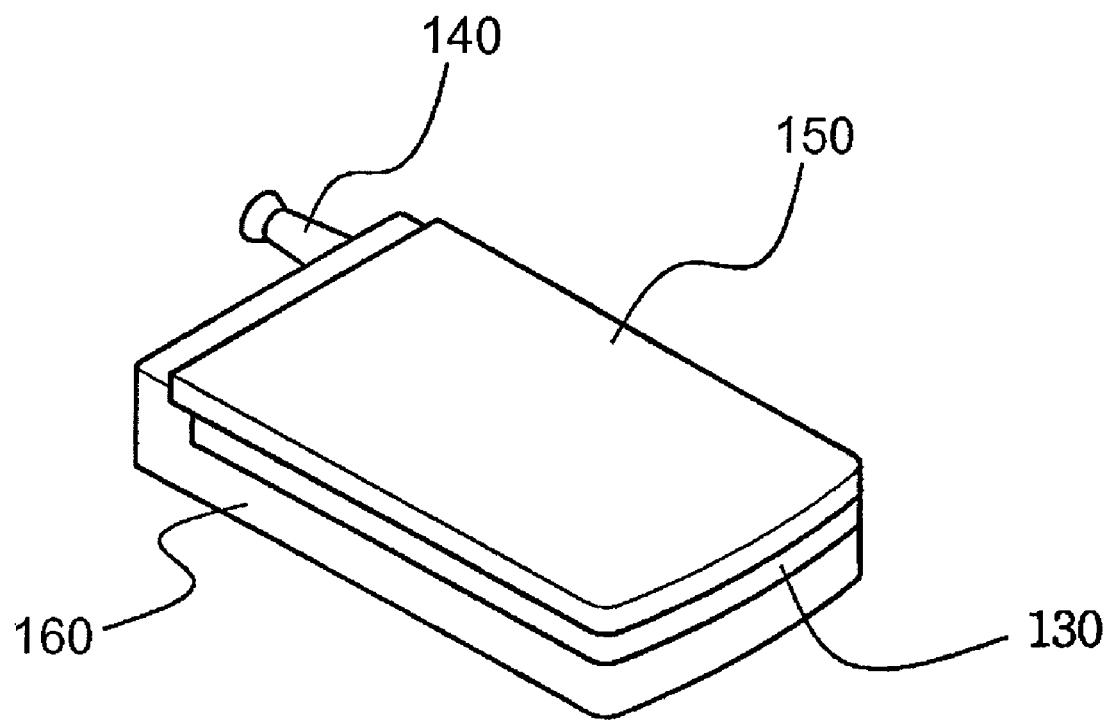

FIGS. 45a and 45b show the main body, to a rear side of which the extended device is connected.

Generally, on the rear side of the main body, a battery 130 is mounted. At this point, connecting grooves 120a, 120b and 120c are provided on the rear portions of the main body and the battery 130 so that the extended portion 150 can be coupled to the connecting grooves. At this point, the connecting grooves 120a and 120b are provided with circuit connecting means.

Other embodiments of the invention will be apparent to those skilled in the art from consideration of the specification and practice of the invention disclosed herein. It is intended that the specification and examples be as exemplary only, with a true scope of the invention being indicated by the following claims.

INDUSTRIAL APPLICABILITY

As described above, the inventive portable multi-display device comprises a main body panel housing and a sub-panel housing each having a display. The panel housings are designed to be separable from and connectable to each other, a range of a border between the displays when the panel housings are interconnected being minimized so that the displays can be shown as if it is driven as a single screen. Therefore, it can provide a convenience in use thereof.

The invention claimed is:
1. A portable multi-display device comprising:
a first housing having a first display;
a second housing having a second display;
pixel electrodes equipped on at least one substrate that comprises the first and second displays;
a joint portion of the at least one substrate in which the first and second displays are adjacent each other when the first and second housings are spread or when the first and second housings are coupled from the separated state together;
protecting means for covering a side of the first and second displays in the joint portion;
a protecting cover for covering both the protecting means and side of the first and second displays in the joint portion; and
central processing units for controlling the display operation of the first and second displays,
wherein,
the pixel electrodes are closer to the joint portion of the substrate than an opposite side of the joint portion of the substrate,
the protecting means is integrated with or separated from sidewall of the first and second housings and has a thickness of less than about 1 mm,
the protecting means exists between the first and second displays when the first and second housings are coupled together and spread so that the first and second displays are adjacent to each other,
in the joint portion, to allow a distance between a display border and an outer border of the first and second housings to be shorter when the first and second housings are coupled together, rather than when the first and second housings are separated from each other, the protecting cover does not exist between the displays when the first and second housings are coupled together,
a height of the protecting cover is higher than that of a surface of the first and second displays when the first and second housings are separated from each other and the protecting cover covers the side of the first and second displays and the protecting means in the joint portion, and
a central process unit in the first housing is configured to control the second display of second housing when the second housing is coupled to the first housing.

2. A portable multi-display device of claim 1 wherein the second housing is coupled to and stacked on a front or rear side of the first housing.

3. A portable multi-display device of claim 1 wherein the displays are disposed on tops of side portions of the first and second housings.

4. A portable multi-display device of claim 3 wherein the display is fixed on the first housing by a chassis enclosing the display and a display drive circuit, and the chassis is provided with a fixing member.

5. A portable multi-display device of claim 4 wherein the chassis is formed in an integral type which encloses a side portion of the display at the joint portion of the first housing.

6. A portable multi-display device of claim 1 wherein a non-display area formed by the first and second displays contacting each other at the one side portions is less than 3.2 mm.

7. A portable multi-display device of claim 3 wherein the first or second display comprises upper and lower substrates and sealant for sealing the upper and lower substrates, the sealant being disposed adjacent to electrodes at the joint portion.

8. A portable multi-display device of claim 1 further comprising coupling detecting means for detecting a coupling state of the first and second housings and a central process unit for selectively driving the displays according to a signal from the coupling detecting means or a mode selection signal.

9. A portable multi-display device of claim 1 further comprising fixing means for securely maintaining the coupling state of the first and second housings.

10. A portable multi-display device of claim 9 wherein the fixing means is provided with a locking device.

11. A portable multi-display device of claim 1 further comprising shock absorbing means formed on a coupling side of the first housing.

12. A portable multi-display device comprising:
a first housing having a first display;
a second housing having a second display;
pixel electrodes equipped on at least one substrate that comprises the first and second displays;
a joint portion of the at least one substrate in which the first and second displays are adjacent each other when the first and second housings are spread from the stacked state together;
protecting means for covering a side of the first and second displays in the joint Portion;
a protecting cover for covering both the protecting means and the side of the first and second displays in the joint portion, and
central processing units for controlling the display operation of the first and second displays,
wherein,
the pixel electrodes are closer to the joint portion of the at least one substrate rather than an opposite side of the joint portion of the at least one substrates,
the protecting means is integrated with or separated from a sidewall of the first and second housings and has a thickness of less than about 1 mm,
the protecting means exists between the first and second displays when the housings are spread so that the first and second displays are adjacent to each other,
in the joint portion, to allow a distance between a display border and an outer border of the first and second housings to be shorter when the first and second housings are spread, rather than when the first and second housings are stacked, the protecting cover does not exist between the first and second displays when the first and second housings are spread,
a height of the protecting cover is higher than that of a surface of the first and second displays when the housings are stacked and the protecting cover covers the side of the first and second displays and the protecting means in the joint portion, and
there exists a mode for driving two screens and a mode for driving one screen in such a manner that the central processing units drive the two screens when the housings are spread, and that the central processing units drive one screen when the housings are stacked.

13. A portable multi-display device of claim 12 further comprising a third display stacked between the first and second displays, wherein an enlarged single screen is from when the first and second displays are spread in opposite directions horizontally.

14. A portable multi-display device of claim 1 wherein an extended portion is coupled to the first housing.

15. A portable multi-display device of claim 14 wherein a memory, an input device or a display is mounted on the extended portion.

16. A portable multi-display device of claim 1, wherein the displays and the driving parts are mounted on the chassis, and the chassis more covers the opposite side of the joint portion than the joint portion when the chassis covers the top portion of the displays.

17. A portable multi-display device of claim 12, wherein the displays and the driving parts are mounted on the chassis, and the chassis more covers the opposite side of the joint portion than the joint portion when the chassis covers the top portion of the displays.

* * * * *